United States Patent [19]

Thielens et al.

[11] Patent Number: 5,666,139
[45] Date of Patent: Sep. 9, 1997

[54] PEN-BASED COMPUTER COPY EDITING APPARATUS AND METHOD FOR MANUSCRIPTS

[75] Inventors: John B. Thielens, Wayne; Mitchell Farbstein, Phoenixville, both of Pa.; Robert Tebbenhoff, Ramsey, N.J.; Clifford L. Martin, Haworth, N.J.; Francis A. Landau, Jr., Long Valley, N.J.

[73] Assignee: Advanced Pen Technologies, Inc., Upper Saddle River, N.J.

[21] Appl. No.: 398,387

[22] Filed: Mar. 3, 1995

Related U.S. Application Data

[63] Continuation of Ser. No. 961,616, Oct. 15, 1992, abandoned.
[51] Int. Cl.$^6$ .................................. G09G 5/00; G06K 9/00
[52] U.S. Cl. .................................. 345/173; 382/189
[58] Field of Search .................................. 345/145, 173, 345/179, 180, 182; 382/13, 14, 57, 59, 186, 187, 188, 189; 395/144, 146, 149, 156, 157, 161

[56] References Cited

U.S. PATENT DOCUMENTS

| | | | |
|---|---|---|---|
| 3,611,291 | 10/1971 | Frank | 340/146.3 Z |
| 3,676,856 | 7/1972 | Manly | 340/172.5 |
| 3,714,636 | 1/1973 | Manly | 340/172.5 |
| 3,781,816 | 12/1973 | Coleman | 340/172.5 |
| 4,787,050 | 11/1988 | Suzuki | 364/479 |
| 4,815,029 | 3/1989 | Barker et al. | 364/900 |
| 4,972,496 | 11/1990 | Sklarew | 382/13 |
| 5,063,600 | 11/1991 | Norwood | 382/13 |

OTHER PUBLICATIONS

"Using WordPerfect 5.1" Special Edition by Que 1989.

"Running MS DOS" by Van Wolverton (Microsoft) 1989.

*Primary Examiner*—Steven Saras
*Attorney, Agent, or Firm*—Arnold D. Litt, Esq.

[57] ABSTRACT

A pen-based computer copy editing apparatus includes a pressure sensitive screen for displaying original text having page breaks thereon; a pen for writing on the screen by applying pressure thereon; and a CPU for (a) identifying handwriting and gestures corresponding to insertions and deletions of portions of the original text and identifying the insertion of typesetting codes and author queries, in response to pressure applied by the pen on the screen, (b) controlling the screen to display the inserted text corresponding to the handwriting in a handwritten font different from the typewritten font already displayed on the screen such that the inserted text is discernable from screen text in the typewritten font, (c) controlling the screen to display the deleted text in the typewritten font with a strike-out therethrough, such that the deleted text is discernable from unmodified screen text in the typewritten font, (d) controlling the screen to display the typesetting codes in a particular font, (e) controlling the screen to display the revised text while maintaining the page breaks, regardless of the amount of handwritten text added to a page of the original text, and (f) controlling the screen to display an indication with respect to an author query in the original text, and to display a writing pad by which a person can enter a question corresponding to the author query, and (g) deleting all stricken-out text, changing all handwritten fonts to typewritten fonts and changing all codes for typesetting.

14 Claims, 29 Drawing Sheets

File Import

Before copying files you must convert the file, pick the word processing format of the file and press the icon to start the conversion.

- DCA/RFT
- Display Write
- Executive Write
- Leading Edge
- Macintosh
- Multimate
- Office Writer
- PC-Write
- PFS:Write
- PFS:Professional
- Q/A Write
- Samna
- Spellbinder
- Volkswriter
- Word
- Wordperfect
- Wordperfect 5.X
- WordStar
- Wordstar 2000
- XyWrite Keyboard   File Import

Chapter 3 ⟨2⟩

Document  Edit  Insert  Case  Format

Chapter 1

*Administration and Scoring Issues*

QUALIFICATION AND BACGROUND OF TEST USERS

The use of the MMPI-A with adolescents requires specific training and exeience in several areas. First, the clinician should be adequately trained in the essential features of test theory and test construction, as well as more specifically in the development and uses of the MMPI and MMPI-A. Therefore, the test user should have completed graduate-level courses in psychological testing and reviewed texts, such as the MMPI handbooks *(Dahlstrom, Welsh, & Dahlstrom, 1972, 1975)*, that have served as definitive references on the MMPI.

Those seeking greater familiarity with the development of the MMPI or MMPI-2, including the composition of the basic validity and clinical scales, or basic interpretive strategies, should also refer to the general guides provided by Friedman, Webb, and Lewak (1989); (1987), AuQury Keyboard  File Import  GlobalChng  Finalize  Time Mng  Jobname  Help

Fig. 6

| Figure 6A |
| Figure 6B | features of test theory and test construction, as well as more specifically in the development and *utilization* of the MMPI and MMPI-A. Therefore, the test user should have completed graduate-level courses in psychological testing and reviewed texts, such as the MMPI handbooks The older ver sions MMPX and MMPY are no l onger valid OK  Clear  Cancel

Fig. 7

Chapter 3     < 2 >

Document  Edit  Insert  Case  Format features of test theory and test construction, as well as more specifically in the development and *utilization* of the MMPI and MMPI-A. *The older versions MMPX and MMPY are no longer valid.* Therefore, the test user should have completed graduate-level courses in

Fig. 8 clinician should be adequately trained in the essential features of test theory and test construction, as well as more specifically in the dev̸e̸lopment and uses of the MMPI and MMPI-A. Therefore, the test user should

Fig. 9 clinician should be adequately trained in the essential features of test theory and test construction, as well as more specifically in the ~~development~~ and uses of the MMPI and MMPI-A. Therefore, the test user should

Fig. 10

| Chapter 1 | ⟨ 2 ⟩ |

Document  Edit  Insert  Case  Format

MMPI and MMPI-A. Therefore, the test user should have completed graduate-level courses in psychological testing and reviewed texts, such as the MMPI handbooks (Dahlstrom, Welsh, & Dahlstrom, 1972, 1975), that have served as definitive references on the MMPI.

Those seeking greater familiarity with the devolopment of the MMPI or MMPI-2, including the composition of the basic validity and clinical scales, or basic interpretive strategies, should also refer to the general guides provided by Friedman, Webb, and Lewak (1989); (1987, 1990);

AuQury 1

Should reference dates be in order?

Archer (1987), Hathaway and Monachesi (1963), and Marks, Seeman, and Haller (1974) ■ AuQury 1  provide reference works concerning the use of the original MMPI form in the assessment of adolescents.

AuQury

Keyboard  File Import  GlobalChng  Finalize  Time Mng  Jobname  Help

Fig. 11

The use of the MMPI-A with adolescents requires
spe⎯⎯⎯⎯⎯⎯⎯⎯⎯⎯⎯⎯⎯⎯⎯⎯⎯⎯⎯⎯⎯⎯⎯⎯⎯he
clin| Find & Replace  ▶  Find & Replace
feat Find:         MMPI-A
mor Match:     ✓ | Same case only
MM                  | Complete word only
com Replace:    MMPI-A1
and Use case of: ▶ Replacement word
(Da Search: ▶ Include Embedded Docs
serv Direction: ▶ Forward
     Start From: ▶ Beginning
T Status:     reached end
of t [ Find ] [ Replace ] [ Replace All ] [ Close ]
the ⎯⎯⎯⎯⎯⎯⎯⎯⎯⎯⎯⎯⎯⎯⎯⎯⎯⎯⎯⎯⎯⎯⎯⎯

Fig. 12

```
                    Chapter 3              < 4 >
Document   Edit  Insert  Case  Format
```

(cn)1
(ct)Communication Process as Target and Tool for
Consultancy Intervention: Rethinking a Hackneyed
Theme
(au)Tom D. Daniels and Sue DeWine
{hd}Ohio University
{ab}The constructs taken; generally by consultants as the
target phenomena for intervention (e.g., power,
leadership, decision making, and structure) are embedded
in the socially constructed realities of organizational life.
Because such realities arise from human symbolic
transaction, communication itself is the central issue in
intervention. Yet, the change strategies that historically
have shaped intervention activity, that is, power-coercive,
empirical-rational, and even theoretically ideal
normative-reeducative strategies do not effectively
confront issues of discourse and meaning as the focal
points of intervention. We describe an alternative
conceptual framework presented by Smircich (1983) that
can be used to reconstruct intervention theory with
principle attention to communication. Smircich's model,
which is derived from interpretive theories of
organization, is intended for management, but can be
adapted readily to provide premises for consultancy
interventions. In light of Smircich's model, we also
describe how the consultant should use communication as
a tool in the intervention process.
{txa}Edgar Schein (1969) call it "one of the most important
processes in organizations" (p. 15). Katz and
Kahn (1978) proclaimed it to be "the very essence of a
social system or organization" (p. 428). Communication,
the ubiquitous process that everyone recognizes as central
to organizational life. One would think that after more

      
Keyboard  File Import  GlobalChng  Finalize  Time Mng  Jobname  Help

Fig. 14

| Finalize |
|---|

Finalizing files allows you to convert you PenEdit file to the word processing format you want for output. Press the icon to start the coversion.

- ASCII (Coded for typesetting)
- DCA/RFT 2
- Display Write
- Executive Write
- Leading Edge
- Macintosh
- Multimate
- Office Writer
- PC-Write
- PFS:Write
- PFS:Professional
- Q/A Write
- Samna
- Spellbinder
- Volkswriter
- Word MS
- Wordperfect
- Wordperfect 5.X
- WordStar
- Wordstar 2000
- XyWrite

Fig. 16

PEN-BASED COMPUTER COPY EDITING APPARATUS AND METHOD FOR MANUSCRIPTS

This application is a continuation of application Ser. No. 07/961,616 filed Oct. 15, 1992 now abandoned.

BACKGROUND OF THE INVENTION

The present invention relates generally to a copy editing apparatus and method, and more particularly, is related to a copy editing apparatus and method utilizing a pen-based computer operating system. In the context of the present application, reference to "pen-based computer" means any computer technology using a stylus, exacting computer operations.

In order to better understand the present invention, it is first necessary to describe existing copy editing procedures for manuscripts. Initially, an author prepares a new manuscript, usually on a computer, using conventional word processing software, such a "WORDPERFECT", "WORD-STAR" or the like. The author then sends the printed manuscript to a publisher for acceptance.

A production editor employed by the publisher reviews the manuscript and decides to publish the manuscript as a book. At this time, the production editor obtains a diskette containing the manuscript from the author and sends the manuscript to a copy editor, who may be an independent person hired by the publisher or an in-house copy editor.

The job of the copy editor is to carefully review the manuscript for changes therein. Specifically, the copy editor first manually folios or numbers all of the pages, and then reviews and edits the manuscript for grammatical and contextual errors by writing the changes on the printed manuscript, and flagging author queries and rewrites. The author queries are questions that the copy editor cannot answer. Thus, the questions are written on the manuscript, with a note tag removably adhered to the page to indicate the author query.

The copy editor also marks the manuscript with style elements for later typesetting of the manuscript. Many of these style elements can be repetitive and extensive. For example, the copy editor will change each double dash "- -" to an EM dash, which is a longer dash that is conventional in typesetting of books. The copy editor will also have to indicate whether spaces should be placed between the EM dash and the preceding and following words. For example, if the author writes "dog - - the", the copy editor may decide that there should be no spaces between the dashes and the words "dog" and "the". An EM dash with no spaces is deemed to be closed, while an EM dash with spaces is deemed to be open. In such case, the copy editor will mark up the text as follows: "dog 1/M the". However, this can become extremely messy and confusing in the case of heavy edits. For example, this may be performed hundreds of times in a manuscript. As another example, the copy editor will change each single dash "-" to an EN dash, which is a shorter dash that is conventionally used between numbers when typesetting books. The copy editor will also have to indicate whether spaces should be placed between the EN dash and the preceding and following numbers. An EN dash with no spaces is deemed to be closed, while an EN dash with spaces is deemed to be open. For example, if the author writes "15 - 17", the copy editor may decide that there should be no spaces between the dashes and the numbers. In such case, the copy editor will mark up the text as follows: "15 1/N 17". However, this also can become extremely messy and confusing in the case of heavy edits, and may be performed hundreds of times in a manuscript.

Other style elements would be to change spellings of words throughout the manuscript, such as from a British to a U.S. spelling, and the like. Further, the copy editor will place markings adjacent, for example, the chapter headings, to indicate how they will print. These are conventionally contained within a circle. For example, adjacent the heading for chapter 1 and in the left margin, the copy editor may place a mark CN surrounded by a circle to indicate a standardized style for the heading which includes typeface, point size, bold, capitals, centering and the like. The copy editor will also make sure that all references to other books and the like have the same format throughout the manuscript, for example, author followed by title, and the like.

The heavily edited manuscript is then sent to the author for approval of the copy edits and to obtain answers with respect to the author query tags. The author then makes any further mark-ups or comments and answers the author query tags by writing on the manuscript, and sends the edited manuscript back to the production editor. The production editor finalizes any changes by making sure that all of the author query tags are answered and making sure that further author comments are consistent with the manuscript. At this time, the manuscript is ready for typesetting.

Because of the heavily marked-up manuscript, the production editor has the manuscript rekeyboarded, that is, retyped with all of the changes incorporated therein, into for example ASCII. The rekeyboarding is performed twice by different persons, and then the retyped manuscripts are run through a computer program that compares the two to make sure that they are consistent. This catches any errors during the retyping. The codes inserted by the copy editor are then inserted separately by another person. Specifically, the style mark-up codes are added. It will be appreciated that the work that the copy editor had performed is thereby duplicated. Alternatively, the original work on the computer can be edited from the marked-up manuscript without rekeyboarding. This results in duplication of work with respect to the manual editing cycle and the subsequent duplicative electronic connection.

The production editor then sends the finalized retyped manuscript and disk therefor, for typesetting. A conventional typesetting system will read the codes on the manuscript and determine the different styles that are required. After the manuscript is typeset, it is sent back to the production editor for approval. The production editor and the author then each proof-read the manuscript. Any corrections are made, and the manuscript is recomposed on the typesetting machine, which provides a film image of each page with a silver emulsion. A cathode ray tube (CRT) images one line at a time and a developer is used to fix the print and wash off the emulsion, leaving black text on a white background paper.

The printer then makes a negative or reverse image of the fixed image and a plate is burned for each page, for use on a printing press drum.

It will therefore be appreciated that there is much duplication and waste in the copy editing process, in view of the manual editing system and retyping of the entire changed manuscript.

Further, the use of pen-based computer operating systems or so-called pen computers is known, albeit not in the copy editing field. Pen computers use a combination screen and slate on which the user writes with an inkless pen. Handwriting recognition is incorporated into such systems, and particularly, printing of letters or symbols by the user on the screen is detected and interpreted by the computer and then inserted into the text on the screen in the specific computer font that is being used. There is a very fast learning curve in which the computer instructs the user to enter various letters in order for the computer to understand the particular user's handwriting. Basically, the computer determines in which direction the pen is moving, how fast the pen is moving, the pressure on the pen, and the like to provide this character recognition.

In addition to the letters and symbols, the computer interprets gestures which direct the computer what to do. For example, a commonly-available pen-based operating system sold under the trademark "PENPOINT" by GO Corporation, provides the following gestures:

| GESTURE | MEANING |
| --- | --- |
| B | BOLD: changes selected text to bold |
| I | ITALICS: italicizes selected text |
| U | UNDERLINES selected text |
| N | RESTORES original text |
| ↓⌐ | CAPITALIZES all selected text |
| ↓ | INITIAL CAPITALIZATION of words (when gesture is started at left) |
| ¬ | LOWER CASE for all selected text |
| ↵ | NEW PARAGRAPH started (when gesture is started from the top) |
| ⌈ | opens space to INSERT CHARACTER |
| L | adds BLANK SPACE |
| X | DELETES word |
| ⌇ | DELETES a character or selected text |
| ^ | CARET: creates a new document or opens a writing pad |
| ^ | CARET TAP: Opens a large embedded writing pad |
| O | CIRCLE: opens a pad for word editing |
| / | PRESS: this indicates a pressing of the pen point on the screen so as to move or drag selected text to new location |
| ! | TAP PRESS: this indicates a tap of the pen point on the screen followed by a press of the pen point - for copying selected text, the pen is dragged to the new point where copying occurs |
| . | SINGLE TAP of the pen point selects the tapped letter, menus or options |
| .. | DOUBLE TAP of the pen point selects a word |
| ∴ | TRIPLE TAP of the pen point selects a sentence |
| :: | QUADRUPLE TAP of the pen point selects a paragraph |
| [ | LEFT BRACKET selects one word to right |
| ] | RIGHT BRACKET selects one word to left |
| [ ] | BRACKETS select text between brackets |
| ∥ | FLICK UP or DOWN to scroll up or down |
| = | FLICK LEFT or RIGHT scrolls to the left or right |
| P | PROOF: shows alternate spellings of a word |
| F | FIND: search and replace a specific word |
| S | SPELL: checks spelling in a selection or document |

However, such a system could not practically be used in the copy editing field. Specifically, if a copy editor were to place an "X" on a word, the word would be deleted entirely. Therefore, an author reading the marked-up text would not know what word was taken out unless he compared the original and marked-up text, which comparison is impractical. Still further, when text is inserted by the copy editor, the text is added in the same font as the existing text. Therefore, an author reading the marked-up text would not know what text was added by the copy editor.

Still further, such a pen computing system does not provide space for author queries or the like.

In addition, with such pen computing systems, and with conventional word processing systems, when text is added or deleted, the entire text will realign to compensate for such addition or deletion. Therefore, if an author were to review the copy editor's changes thereon, the entire page numbering scheme would be different, and it would be difficult and burdensome to determine how the page numbers of the changed text related to the page numbers of the original text.

Still further, such pen computing systems generally provide a spelling checker, similar to conventional word processing computer systems. Such spelling checkers generally include a master list provided by the software vendor and a master update list which the user can add to. However, in many instances, the words in one manuscript might need to be spelled differently from words in another manuscript. As a result, a master list could not be used. Rather, a separate list would be required for each manuscript.

Further, it is desirable to provide a time record of the amount of time a copy editor spends on a job, particularly if the copy editor is an independent person not employed by the production manager. Although time keeping systems are generally known, there is no known system that automatically maintains a record of time for a particular job as part of the pen computing process. Generally, time keeping systems in computing systems must be opened separately, with the data of the particular job manually set thereinto.

Related to the above, it is noted that U.S. Pat. No. 5,063,600 to Norwood, the entire disclosure of which is incorporated herein by reference, discloses a hybrid information management system for handwriting and text. However, with this system, the user merely writes on the screen and the writing shows up as a graphical diagram of the user's handwriting. There is no means by which the device interprets the user's handwriting and then converts the same to a font on the screen.

U.S. Pat. No. 4,815,029 to Barker et al, the entire disclosure of which is incorporated herein by reference, discloses a similar system in which there is no interpretation or conversion of the user's handwriting.

U.S. Pat. No. 3,714,636 to Manly, the entire disclosure of which is incorporated herein by reference, discloses an automatic editing method with page formatting. Specifically, this reference does not relate to a pen computer system, although it does relate to a system to avoid manually retyping or rekeyboarding textual material when revising the same. See also U.S. Pat. No. 3,676,856, the entire disclosure of which is incorporated herein by reference.

U.S. Pat. No. 3,781,816 to Coleman et al, the entire disclosure of which is incorporated herein by reference, discloses an automatic publications system which also does not use a pen computing system.

OBJECTS AND SUMMARY OF THE INVENTION

Accordingly, it is an object of the present invention to provide a pen-based computer copy editing apparatus and method for manuscripts that overcomes the problems with the aforementioned prior art.

It is another object of the present invention to provide a pen-based computer copy editing apparatus and method for manuscripts that permits a person to view additions of text in a different font from existing text.

It is still another object of the present invention to provide a pen-based computer copy editing apparatus and method for manuscripts that permits a person to view additions of text in a consistent handwriting font that is different from existing text and which is always easy to read and legible.

It is yet another object of the present invention to provide a pen-based computer copy editing apparatus and method for manuscripts that permits a person to view text that has been deleted with a strike-out line therethrough.

It is a further object of the present invention to provide a pen-based computer copy editing apparatus and method for manuscripts that provides an insert in the text to indicate an author query, with the actual author query being located in a pop-up text and/or separate sheet.

It is a yet further object of the present invention to provide a pen-based computer copy editing apparatus and method for manuscripts in which the page numbers of the changed text are the same as the page numbers of the original text, regardless of the extent of changes to the text.

It is another object of the present invention to provide a pen-based computer copy editing apparatus and method for manuscripts which permits a separate list for each manuscript for global changing purposes.

It is still another object of the present invention to provide a pen-based computer copy editing apparatus and method for manuscripts that automatically keeps track of the time spent by a copy editor when editing the manuscript.

It is yet another object of the present invention to provide a pen-based computer copy editing apparatus and method for manuscripts that automatically keeps track of the number of edits made by a copy editor for a particular job, the number of times a manuscript document is opened, the number of words in the manuscript, the number of characters in the manuscript and the number of revisions made by the copy editor.

In accordance with an aspect of the present invention, a pen-based computer copy editing apparatus includes a screen for displaying original text thereon; a pen for writing on the screen in an inkless manner by moving along the screen; and a central processing unit (CPU) for identifying handwriting and gestures by a person corresponding to modifications of portions of the original text in response to movement of the pen along the screen, and for controlling the screen in response substantially only to said handwriting and gestures to display the modified portions of the original text in a modified form visually different from unmodified text in order for the person to view the modifications without reference to the original text.

Specifically, the central processing unit identifies handwriting and gestures corresponding to insertions of text in the original text in response to movement of the pen along the screen, and controls the screen to display the inserted text corresponding to the handwriting in a handwritten font different from the typewritten font already displayed on the screen, such that the inserted text is discernable from text on the screen in the typewritten font. This includes the insertion of handwritten typesetting codes.

Further, the CPU identifies gestures corresponding to deletions of text in the original text in response to movement of the pen along the screen, and controls the screen to display the deleted text in the typewritten font with a strike-out therethrough, such that the deleted text is discernable from unmodified text on the screen in the typewritten font.

In addition, the CPU keeps track of the amount of time in which the original text is being modified, the number of modifications made in the original text, the number of times a file corresponding to the original text is opened, and the number of words in the modified original text.

Also, the original text includes page breaks, and the central processing unit controls the screen to display the original text with inserted text therein so as to maintain the page breaks regardless of the amount of handwritten text added to a page of the original text.

The CPU also controls the screen to display an indication with respect to an author query in the original text, and controls the screen to display a writing pad by which a person can enter a question corresponding to the author query, along with a separate list of the author queries.

In accordance with another aspect of the present invention, a method for editing original text in a pen-based computer system, includes the steps of displaying the original text on a screen; writing on the screen with an inkless pen by moving along the screen; electronically identifying handwriting and gestures corresponding to modifications of portions of the original text made by a person in response to movement of the pen along the screen; and displaying the portions of the original text on the screen in a modified form visually different from unmodified text in response substantially only to said handwriting and gestures in order for the person to view the modifications without reference to the original text.

The above and other objects, features and advantages of the invention will become readily apparent from the following detailed description thereof which is to be read in connection with the accompanying drawings.

BRIEF DESCRIPTION OF THE DRAWINGS

FIG. 2 is a plan view of a screen display for converting a manuscript from the author's word processing system to the pen computer system language used by the present invention;

FIG. 3 is a plan view of a screen display showing a table of contents when different author chapters have been assembled into a common document;

FIG. 4 is a plan view of a screen display showing the editing process of the chapter titles in the table of contents;

FIG. 5 is a plan view of a screen display showing the edited table of contents;

FIG. 6 is a plan view of a screen display showing the text of a converted manuscript;

FIG. 7 is a plan view of a screen display showing an editing operation which inserts text;

FIG. 8 is a plan view of a screen display showing the end result of the insertion operation of FIG. 7;

FIG. 9 is a plan view of a screen display showing an editing operation which deletes text;

FIG. 10 is a plan view of a screen display showing the end result of the deleting operation of FIG. 9;

FIG. 11 is a plan view of a screen display showing the insertion of an author query;

FIG. 12 is a plan view of a screen display showing the find function;

FIG. 14 is a plan view of a screen display showing the find function;

FIG. 16 is a plan view of a screen display for converting a manuscript from the pen computer system language used by the present invention to another word processing system language for printout or to a typesetting language;

DETAILED DESCRIPTION OF A PREFERRED EMBODIMENT

Figure 1:
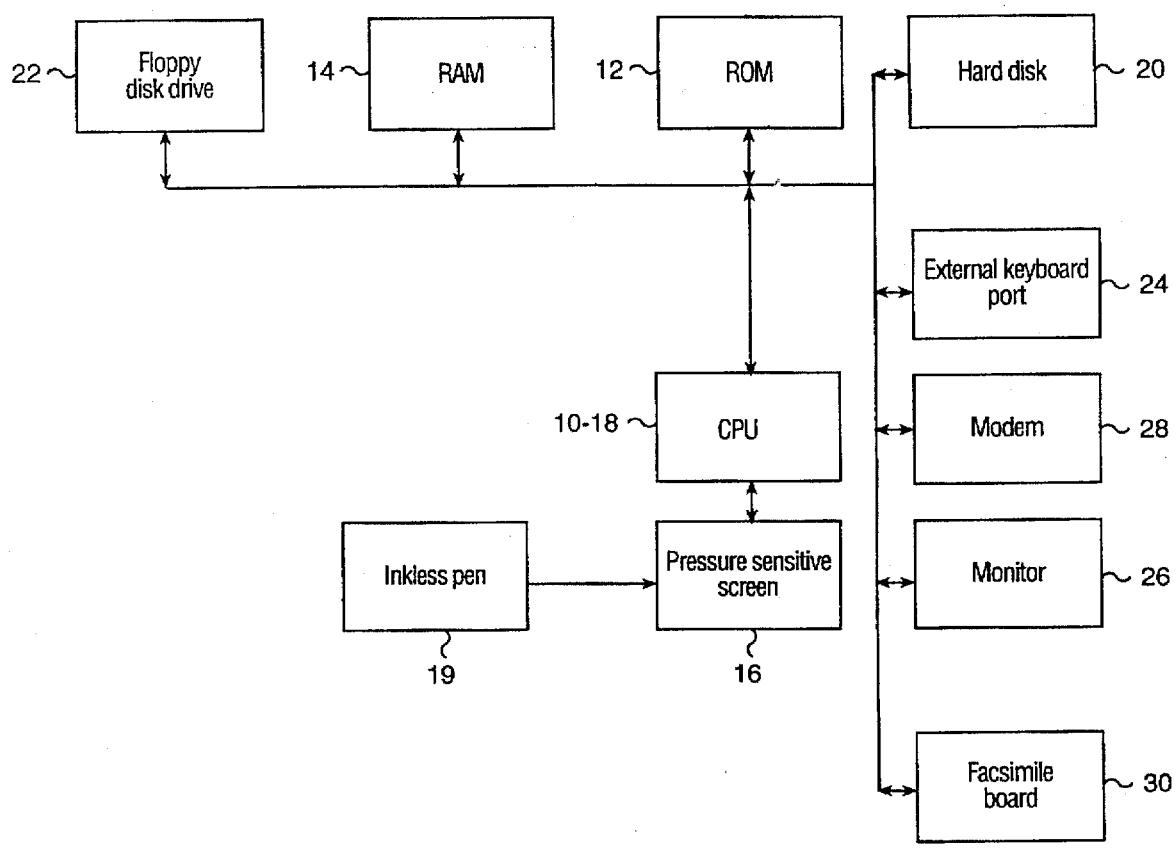
FIG. 1 is block diagram of a pen computer system with which the present invention can be used.

Referring to the drawings in detail, and initially to FIG. 1 thereof, a copy editing apparatus 10 for manuscripts according to the present invention can use the elements of a conventional pen computer, as discussed above, for example, the pen-based operating system sold under the trademark "PENPOINT" by GO Corporation, which is incorporated herein by reference. Other pen-based operating systems can be used, such as one sold by Grid Systems Corporation under the trademark "PENRIGHT", and one sold by Microsoft under the trademark "Windows for Pen Computing". Further, any UNIX based computer can be used.

Such a pen-based operating system includes a read-only memory (ROM) 12 for storing a pen operating system, a random access memory (RAM) 14 which functions to provide the working area and temporary storage area for the computer and/or storing the pen operating system, a pressure sensitive screen 16 on which a person can write with an inkless pen. It will be appreciated that any other type of screen can be used herein, such as a screen which detects movement of the pen along the screen, rather than pressure applied thereto. Hereinafter, reference to a pen moving along a screen shall refer to both types of systems. A central processing unit (CPU) 18 controls the operation of the pen computing system and controls screen 16 to display text in a predetermined manner in accordance with user writing thereon. CPU 18 generally operates in accordance with the software within ROM 12 or RAM 14 to control the display on screen 16, that is, to display text in a typewritten font, in accordance with character recognition software within ROM 12 or RAM 14. CPU 18 determines the specific characters in response to the direction an inkless pen 19 is moving thereon, how fast pen 19 is moving, the pressure on pen 19, and the like. In addition to letters and symbols, CPU 18 interprets gestures of pen 19, which direct the computer what to do, such as the gestures discussed above.

In addition to the above, copy editing apparatus 10 preferably includes a hard disk 20 for storing the manuscripts, a floppy disk drive 22, an external keyboard port 24 by which a keyboard (not shown) can be used to input various commands and changes to the text, a monitor port 26 by which a monitor (not shown) can be attached for better viewing of the text, a modem 28 for transmitting to or receiving from another location, and a facsimile board 30 for transmitting documents to or receiving documents from another facsimile machine. Preferably, CPU 18 includes at least a 386 based chip running at 20 MHz, RAM 16 includes at least 4 MB of memory, and hard disk 20 has a capacity of at least 60 MB.

The present invention has modified various functions of conventional pen computer systems to provide a system that is ideally suited for the aforementioned copy editing process. The changes in the aforementioned conventional pen computer occur in the software that guides the elements, and in this regard, reference is made to various flow chart diagrams which discuss these changes and to various other diagrams showing the operation of these changes in the copy editing process.

In the copy editing process, as aforementioned, an author submits a manuscript for publication. After the production editor makes a decision to publish the manuscript, the production editor requests the author to supply a copy of the manuscript on a floppy disk. It will be appreciated that the author may be using a DOS operating system, such as those sold under the trademarks "WORDPERFECT", "WORDSTAR", "WORD", "XYWRITE" or the like, a MACINTOSH (Apple) operating system, or any other system. It is therefore necessary to convert the manuscript to the pen computer's operating system. In order to perform this function, conventional software is provided in copy editing apparatus 10, and in particular, either stored in ROM 12 or on hard disk 20. Examples of conversion software that can be used are those sold by Pacific Microelectronics, Inc., 201 San Antonio Circle, C250, Mountain View, Calif. 94040 under the trademark "MAC-IN-DOS" which converts Macintosh data formats to DOS data formats; Advance Computer Innovations, 30 Burncoat Way, Pittsford, N.Y. 14534 under the trademark "WORDPORT" which converts different word processing program formats and Blueberry Software, 7207 Bodega Avenue, Sebastopol, Calif. 95472 which also converts different types of word processing program formats.

Thus, with the author's manuscript written onto hard disk 20, the copy editor calls up the author's manuscript by tapping pen 19 on the name for the manuscript on the main screen and then converting the same to the pen editing system format, for example, by tapping pen 19 on one of the formats or the icon to the left of the format, as indicated in FIG. 2, corresponding to the format of the author's original manuscript. The author's manuscript is then stored on hard disk 20 in the pen computing system language.

It will be appreciated from a review of FIG. 2 that copy editing apparatus 10 provides conversion of a large variety of word processing disk formats into a standard pen computing language. Such conversion maintains all font changes, paragraph breaks, and tab calls so that the copy editor will see the manuscript as if the same were printed on paper. This conversion eliminates the usual cost charged for disk conversion by a typesetter.

Once the manuscript is stored on hard disk 20 in the pen computer format, it is ready for the copy editor to edit the same.

Figures 3, 4, 5:
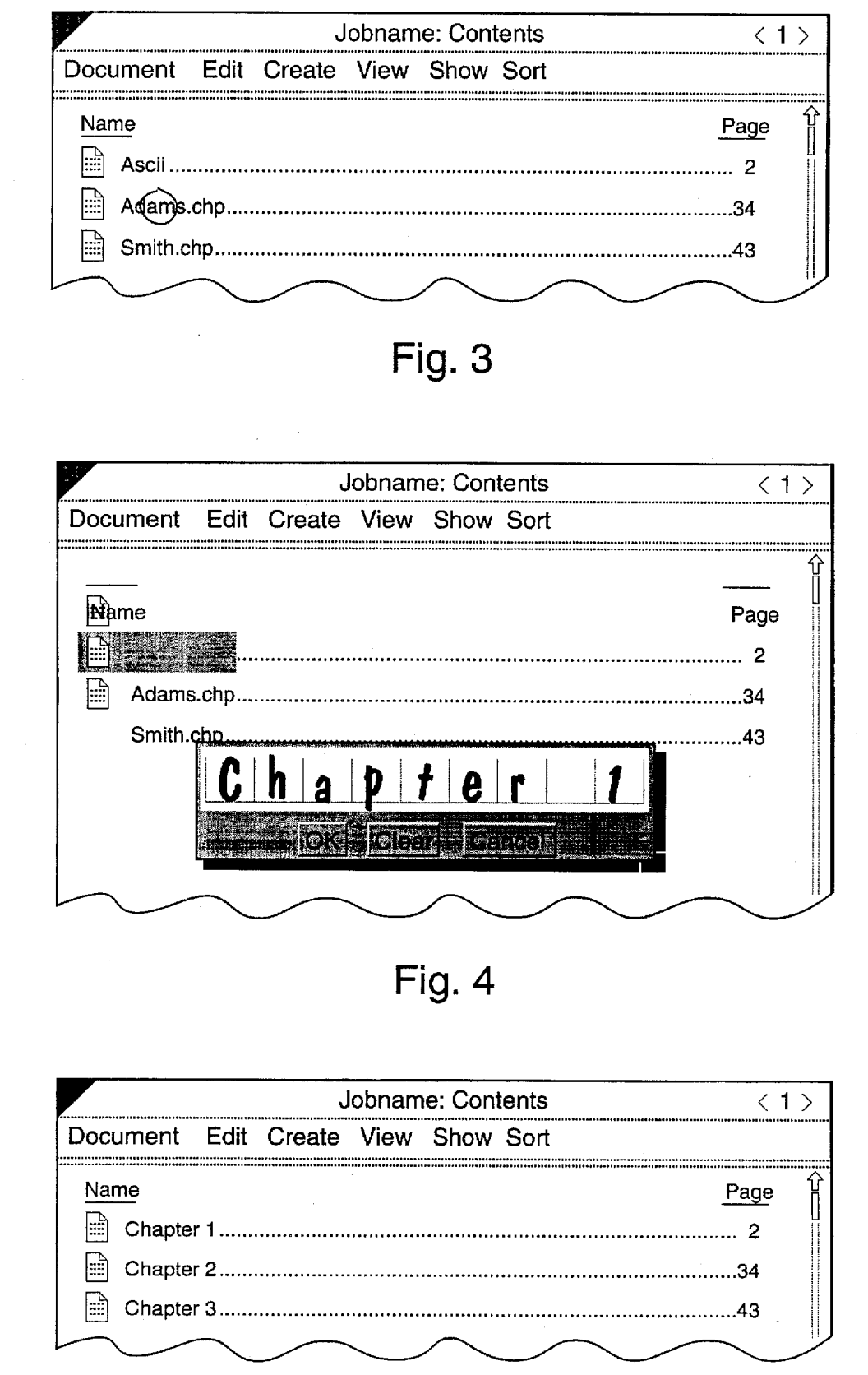

Generally, the author's manuscript will be stored in separate chapters under different names corresponding to the different chapters or under the author's name. The copy editor calls up the different chapters and assembles the same in a common document, for example, as shown in FIG. 3, thereby forming a table of contents. It will be appreciated that copy editing apparatus 10 automatically folios or numbers the pages of the chapters, that is, it produces a paged manuscript.

However, it is necessary for the copy editor to designate the different chapters by the designations "Chapter 1", "Chapter 2" and so on. Therefore, to edit the table of contents, the copy editor circles the particular chapter. As an example, the designation "Adams.chp", that is, the Adams chapter, is circled, as shown in FIG. 3. The circle, as indicated in the above known gesture table of a conventional pen computing system, opens a pad for word editing, as shown in FIG. 4, and highlights the chapter. The copy editor then writes in the name of the new chapter title, for example, "Chapter 1", as shown in FIG. 4. This is performed for all of the chapters, so that the result of FIG. 5 is obtained.

As discussed above, the copy editor can edit the text. In such operation, the copy editor will start reading and marking up the text by using pen 19 on screen 16. Specifically, the copy editor taps on the particular chapter, for example, Chapter 1, from the table of contents, and the text of that chapter appears, for example, as shown in FIG. 6.

Before reading the text, however, the copy editor will then use a "global command" menu to automatically perform many of the repetitive tasks normally performed by hand, and in particular, to perform global search and replace. This will include changing double hyphens into open or closed EM dashes, changing hyphens surrounded by number sets into open or closed EN dashes, and using a word list that changes multiple misspellings throughout the manuscript into one consistent spelling. Such a word list can supplement the fixed dictionary built into the pen computing software, and will be specifically associated with the particular file or manuscript that is opened. For example, the copy editor may wish to change the British spelling of the word "characterizing" to the U.S. spelling "characterizing".

It is an important aspect of the present invention that the global changes occur as a unit, that is, there is no necessity for the copy editor to perform a search and replace on each word. In other words, the global search and replace changes double hyphens, single hyphens and the dictionary spellings throughout the document for all words and symbols designated by the copy editor. After the copy editor selects the particular changes to be implemented, for example, a closed EM dash and the like, he merely taps on the "Global Chng" icon at the bottom of the screen, as shown in FIG. 6, and copy editing apparatus 10 can automatically effect such changes throughout the document that is opened. As will be appreciated from the discussion below, any such additions are written in a handwritten font and any deletions show a strike-out through the word or words that are changed.

Figure 6A:
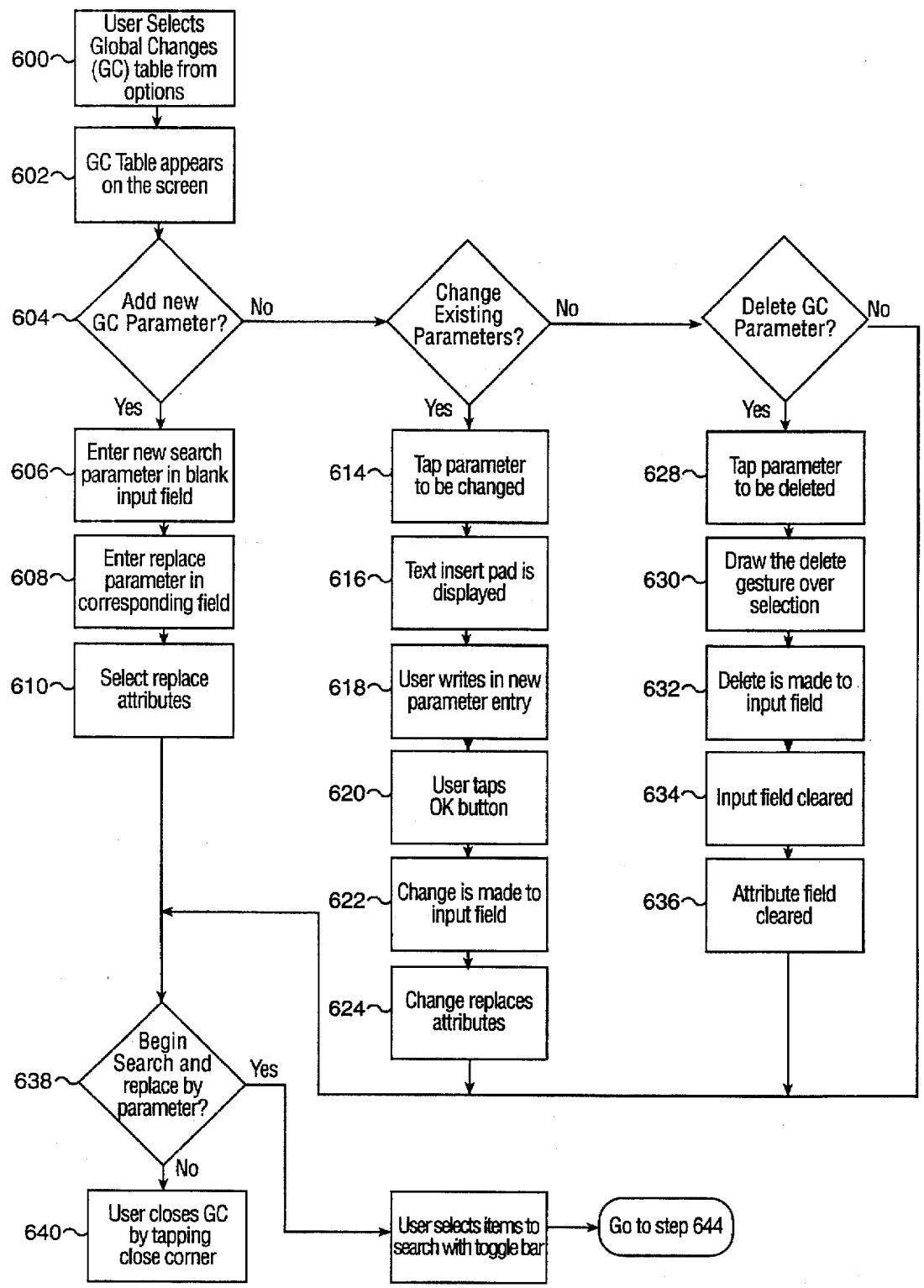
FIGS. 6A and 6B show a flow chart for defining the word list and for actuating the global change procedure.
Figure 6B:
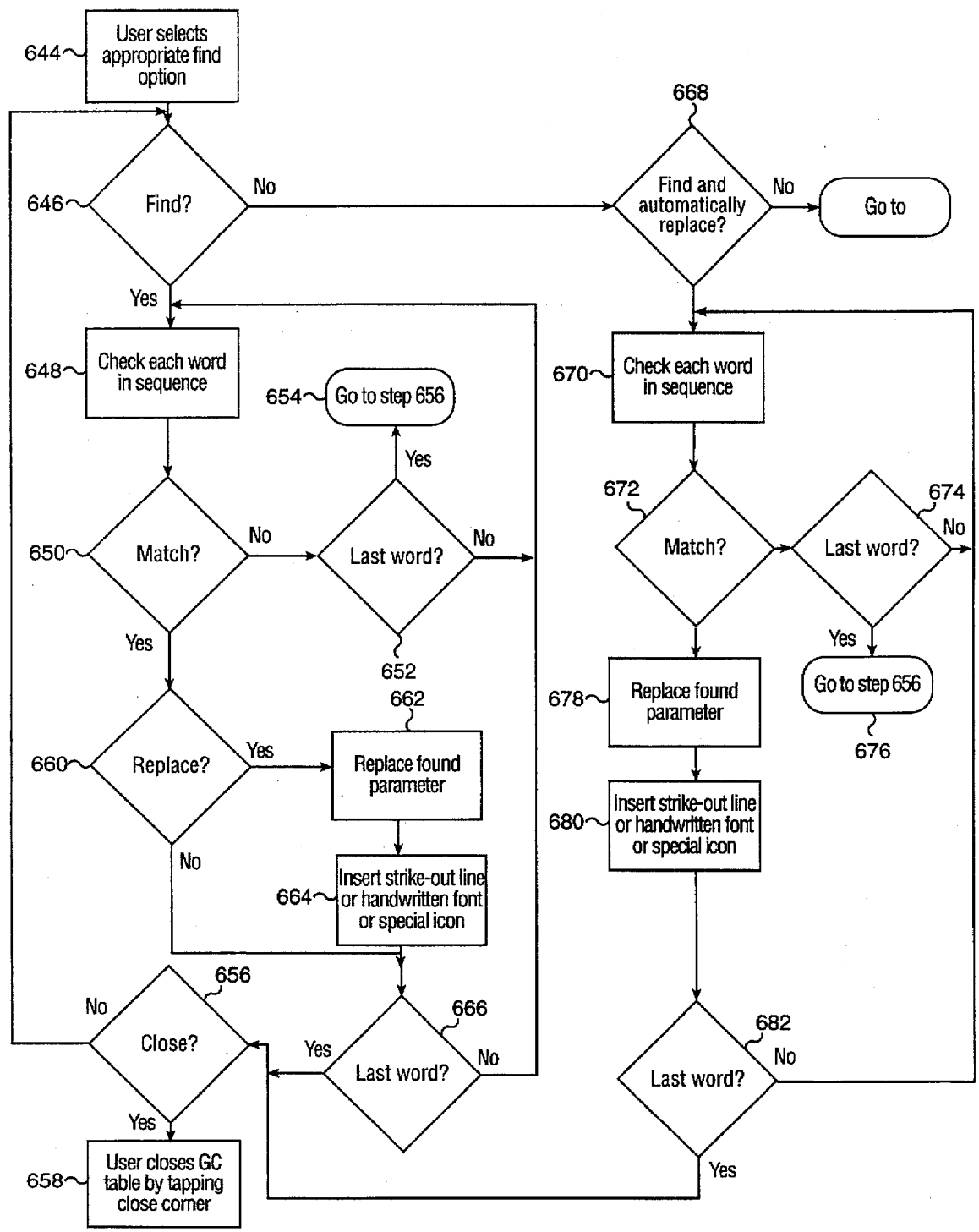

FIGS. 6A and 6B show a flow chart for defining the word list and for actuating the global change procedure.

Referring first to FIG. 6A, in step 600, the user, that is, the copy editor who wants to build a global change table specific to his uses, selects the global change table from the options on the screen by tapping the same with the pen. Accordingly, in step 602, the global change table appears on the screen. The global change table includes a list of changes to be made, for example, with respect to the aforementioned M-dashes, N-dashes, spellings and the like.

The copy editor has the option of adding a new global change parameter to the table, changing an existing global change parameter or deleting a global change parameter.

Therefore, it is first determined in step 604 whether a new global change parameter is to be added. If yes, the copy editor adds a new search parameter (for example, "characterizing") corresponding to a word to be changed on a blank input field of the table in step 606, enters a replace parameter (for example, "characterizing") corresponding thereto in step 608 and selects various replace attributes in step 610. For example, one replace attribute may involve the case of the letters of a word. As a specific example, if the copy editor wants to replace "Characterizing" or "characterizing" with the word "characterizing", he instructs the computer to do so regardless of the case of the first letter of the word. Another replace attribute is termed "match", that is, an instruction is provided to replace only where the same case is provided. Another replace attribute could be an instruction to provide replacement only where there is a complete word, as opposed to an abbreviation followed by a period. Although not shown in the flow chart, it will be appreciated that the copy editor would be given the opportunity to return to step 604 for further changes of adding a new global change parameter to the table, changing an existing global change parameter or deleting a global change parameter.

If the answer in step 604 is no, the copy editor is questioned as to whether an existing global change parameter should be changed in step 612. If yes, the copy editor taps the global change parameter from the list in the table, in step 614, whereupon a text insert pad is displayed in step 616. The text insert pad is similar to the pad shown in FIG. 7, which is discussed hereinafter. The copy editor then writes in the new global change parameter in step 618 and taps an "OK" button in step 620, whereupon a change is made to the input field of the table in step 622, and the replace attribute is changed in step 624. Although not shown in the flow chart, it will be appreciated that the copy editor would be given the opportunity to return to step 604 for further changes of adding a new global change parameter to the table, changing an existing global change parameter or deleting a global change parameter.

If the answer to step 612 is no, the process continues to step 626, where the copy editor is asked whether a global change parameter should be deleted. If yes, the copy editor taps the global change parameter to be deleted in step 628, and draws a delete gesture over the selection in step 630, for example, the gesture "X" for deleting a word. The portion of the input field corresponding to that global change parameter is then deleted in step 632, whereupon the input field is cleared in step 634 and the attribute field is cleared in step 636.

At the end of each step 610, 624, 626 (NO) and 636, the copy editor is given the option of beginning the search and replace operation, in step 638. If no, the user closes the global change table by tapping the "Close" button in the corner of the screen, in step 640. If yes, the copy editor selects the items or parameters to be searched in step 642. This is accomplished by toggling on the appropriate item, such as the word "characterizing", whereby a symbol is placed in the table next to that item.

Then, as shown in FIG. 6B, the user must select the appropriate find option, in step 644. Specifically, the first find option is a search and replace option where the user is prompted at each match as to whether a change should be made. In the second search option, the replacement is automatically performed.

Thus, in step 646, the computer determines whether the first search option has been selected. If yes, the computer checks each word of the document in sequence in step 648. After detecting a word in step 648, a determination is made in step 650 whether a match occurs with any of the words selected in the global change table. If no, it is determined in step 652 if this is the last word to be checked in the document. If no, the process returns to step 648 to check the next word. If it is the last word, in step 654, the process jumps to step 656, where the copy editor is prompted as to whether to close the search and replace operation, or to continue. If the decision to close is made, the process goes to step 658 where the user closes the global change table by tapping a "Close" button in a corner of the screen. If not, the process returns to step 646.

If a match is found in step 650, the user is prompted whether to perform a replacement of that word, in step 660. If yes, the parameter (word or the like) is replaced in step 662. Further, in step 664, if a word is replaced, the old word is retained and a strike-out is placed through the old word, while the new word is written in a handwritten font. In the same manner, if other than a word is replaced, such as a typesetting code or the like, a special icon representing the same is placed at such position. It is then determined if this is the last word of the document to be searched in step 666. If no, the process returns to step 648. If yes, the process continues to step 656.

If the first search option is not selected, as determined by a negative answer in step 646, the process continues to step 668, to determine whether the second search option has been selected. If yes, each word is checked one by one in sequence in step 670. A determination is made in step 672 after a word is detected as to whether a match occurs with any of the words selected in the global change table. If no, it is determined in step 674 if this is the last word to be checked in the document. If no, the process returns to step 670 to check the next word. If it is the last word, in step 676, the process jumps to step 656, where the copy editor is prompted as to whether to close the search and replace operation, or to continue.

If a match is found in step 672, the parameter (word or the like) is automatically replaced in step 678. Further, in step 680, if a word is replaced, the old word is retained and a strike-out is placed through the old word, while the new word is written in a handwritten font. In the same manner, if other than a word is replaced, such as a typesetting code or the like, a special icon representing the same is placed at such position. It is then determined if this is the last word of the document to be searched in step 682. If no, the process returns to step 670. If yes, the process continues to step 656.

As will now be described, by utilizing a pen-computing environment, copy editing apparatus 10 allows the copy editor to mark-up screen 16 in the same manner as if the manuscript would appear on paper. For example, through the use of the aforementioned and other gestures, a copy editor can make a word upper case (⌐), delete a word (X), insert a letter, word, or paragraph ( ), make a word bold (B) or italic (I) and stet (E) any edits, as with the aforementioned table of gestures.

It is an extremely important aspect of the present invention that all of the changes be easily recognizable. Specifically, it is an important aspect that any word inserted or added shows up in a "handwritten" font, and any deletions show up as strike-outs. This is shown best in FIGS. 7 and 8 with respect to the addition of text. As shown in FIG. 7, the copy editor writes caret tap (ˆ), that is, the copy editor writes a caret followed by a tap of the pen 19 on screen 16. The pen computing system then opens a writing pad, as shown in FIG. 7, whereupon the copy editor writes in the added text. The pen computing system then performs its conventional character recognition operation to determine the letters to be added.

It will be appreciated that, in a conventional pen computing system, the added text would be added in the same font as the text already displayed on screen 16. However, an author reading such modified text would not know where the new text was added, without comparing the modified manuscript to the original manuscript.

Therefore, in accordance with the present invention, as shown in FIG. 8, the added text is added in a handwritten font. Thus, an author who later reviews the revised manuscript can easily determine which text was added. However, for large text inserts, it is still best to use a computer keyboard. In this regard, when using the present invention, the added text, whether by pen or keyboard, is displayed as a handwritten font text.

Further, and in a similar vein, when a word or group of words is deleted, as shown, for example, by the "X" gesture placed through the word "development" in FIG. 9, the original word appears in the final version, either scratched-out or with a single strike-out line therethrough, as shown in FIG. 10. In a conventional pen computing system, this would result in the word being erased from screen 16, so that an author later reviewing the text would not know the text that was deleted, without comparing the modified manuscript to the original manuscript.

Figure 10A:
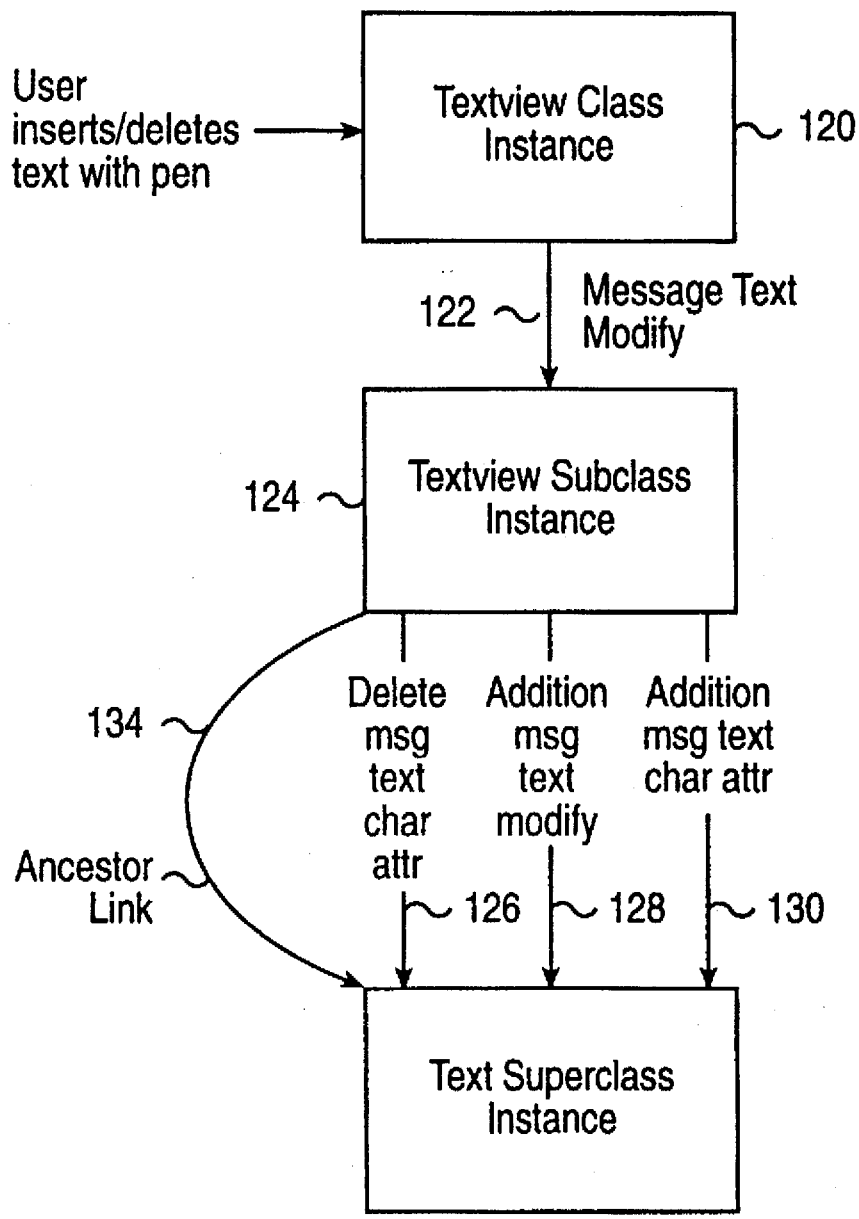
FIG. 10A is a flow chart diagram for explaining modification of text according to the present invention.
Figure 10B:
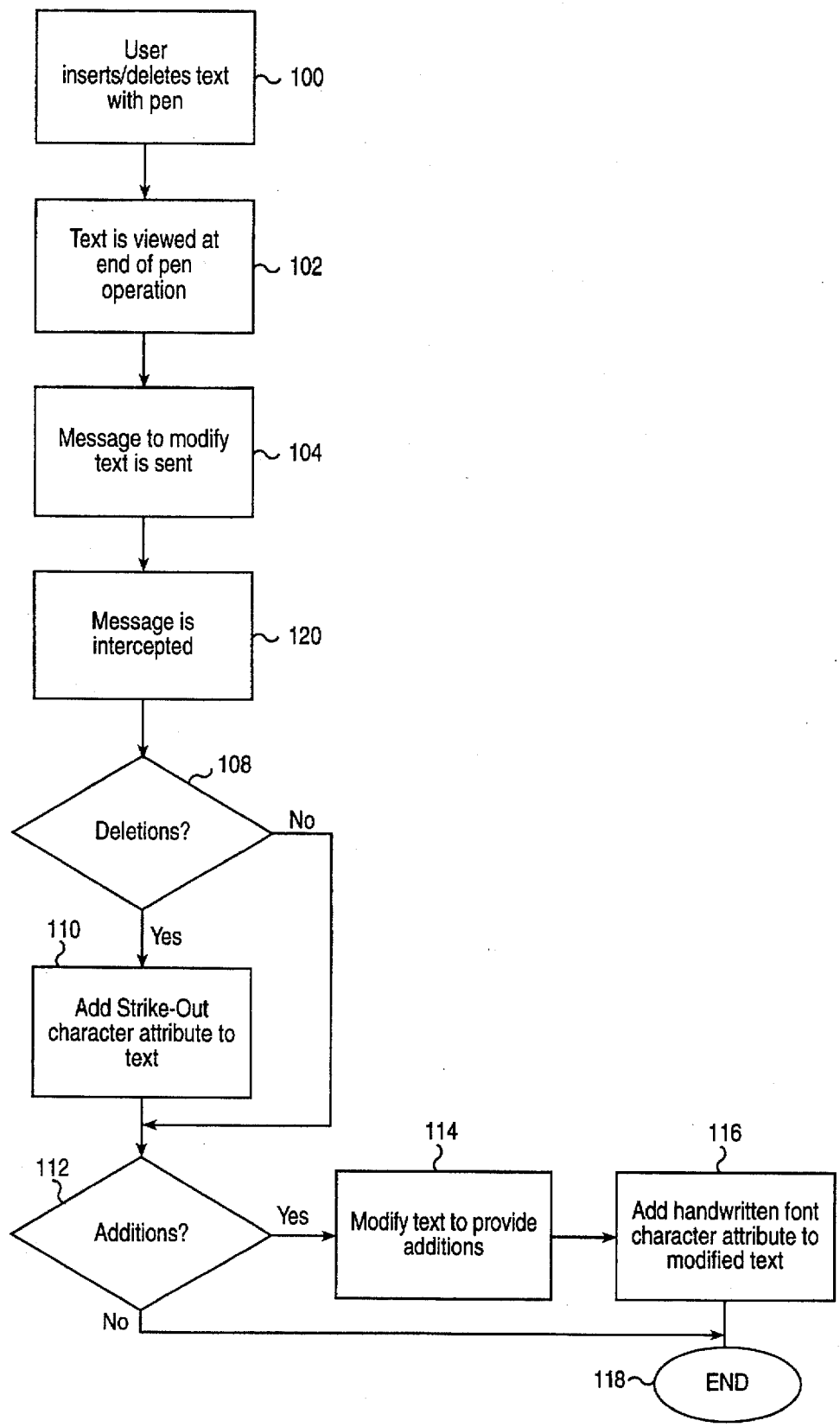
FIG. 10B is another flow chart diagram, similar to FIG. 10A, for explaining modification of text according to the present invention.

Reference is now made to FIGS. 10A and 10B for flow chart diagrams explaining the addition and deletion operations according to the present invention. Specifically, FIG. 10A is a flow chart diagram shown in the manner that is best understood by a programmer knowledgeable in pen-based operating systems, while FIG. 10B is a more conventional flow chart diagram. Both describe the same operations and will now be described.

In FIGS. 10A and 10B, the user inserts and/or deletes text with a pen, as discussed above. This is shown in step 100 in FIG. 10B and is merely written in as an input in FIG. 10A. In FIG. 10A, the process then moves to step 120 for a TEXTVIEW CLASS INSTANCE. This refers to viewing of the text, generally in ASCII or another suitable format, after the changes have been made by the user. The equivalent step is shown by step 102 in FIG. 10B.

Thereafter, a MSG TEXT MODIFY instruction is sent for modification of the text, based on the viewing of the text in the aforementioned step. This is shown by arrow 122 in FIG. 10A and by step 104 in FIG. 10B. This message may encode both text to be inserted and a text region to be deleted. It is noted that the above steps are conventional in, for example, the aforementioned PENPOINT operating system.

Conventionally, in the aforementioned PENPOINT operating system, however, the next and final step would be a TEXT CLASS INSTANCE, in which additions are made in the text in the same font as the surrounding text, or the deleted text is erased from the text.

However, with the present invention, in step 124 in FIG. 10A and step 106 in FIG. 10B, the message to modify the text is intercepted by what is known as a TEXT SUBCLASS INSTANCE, which is effectively a sub-routine.

At this time, in step 108 in FIG. 10B, it is determined if there are any deletions. If yes, a MSG TEXT CH. ATTR. (message text character attribute) is added to the deletion region, as shown by arrow 126 in FIG. 10A. This MSG TEXT CH. ATTR. constitutes a strike-out (line-through) character attribute added to the deletion region so that the deletion region remains, but includes a strike-out (line-through) therethrough when displayed or printed. This is also shown by step 110 in FIG. 10B.

In this regard, it is noted that all text has character attributes associated therewith, such as the type of font, the point size, bold, etc. The present invention adds another character attribute corresponding to the line-through to the text to be deleted.

Thereafter, and also in the event that the answer to step 108 is no, it is determined if there are any additions to the text. If yes, the text is modified to provide or add the additions thereto. This is shown by arrow 128 in FIG. 10A and by step 114 in FIG. 10B. However, a subsequent step is also provided, namely to add a handwritten font character attribute to the added text. This is shown by step 116 in FIG. 10B and by arrow 130 in FIG. 10A.

As a result, as shown by step 132 in FIG. 10A, a TEXT SUPERCLASS INSTANCE is provided in which the text is modified, as described above, that is, with additions being added in a handwritten font and deletions having a strike-out (line-through). In addition, there is an ancestor link 134 which determines that the TEXT SUPERCLASS INSTANCE is now the original text to be viewed for future modifications.

Another important aspect of the present invention is the author query tags. Author queries are questions that the copy editor cannot answer. Conventionally, the questions are written on the manuscript, with a note tag removably adhered to the page to indicate the author query. In accordance with the present invention, author query tags are flagged on the file exactly where needed. This allows the manuscript to be heavily edited without extensive and confusing copy editing marks, especially for the insertion of text.

This aspect is shown best in FIG. 11. As shown therein, when the copy editor is at a point in the text where he must ask the author a question, for example, after "(1974)" in FIG. 11, the copy editor taps twice on the "AuQury" icon in the cork menu at the bottom of screen 16 and drags the icon to the appropriate place in the text. A cork menu is a small menu at the bottom of a screen in a conventional pen computing system which is normally kept blank. Accordingly, a writing pad similar to that shown in FIG. 7 opens up for the copy editor to write the question. Alternatively, any icon can appear at any other portion of the screen such as the top of the screen.

Then, copy editing apparatus 10 merely inserts a designation "AuQury #" at the point of text, where # is the number in order of the particular author query. The author queries are numbered in order of appearance in the text and are printed out on a separate sheet for the author along with the revised manuscript. Then, when the author is reading the text and comes upon an indication that there is an author query, he merely looks on the sheet for the particular number and writes in the answer on the separate sheet. Preferably, the author queries on the separate sheet refer to the chapter and page.

It will therefore be appreciated from the above that an author can review the revised manuscript, when printed out, while viewing any additions in a handwritten font, any deletions by a strike-out and any author queries by a separate mark in the text. The text therefore is cleaner and easier for the author to review.

Figure 11A:
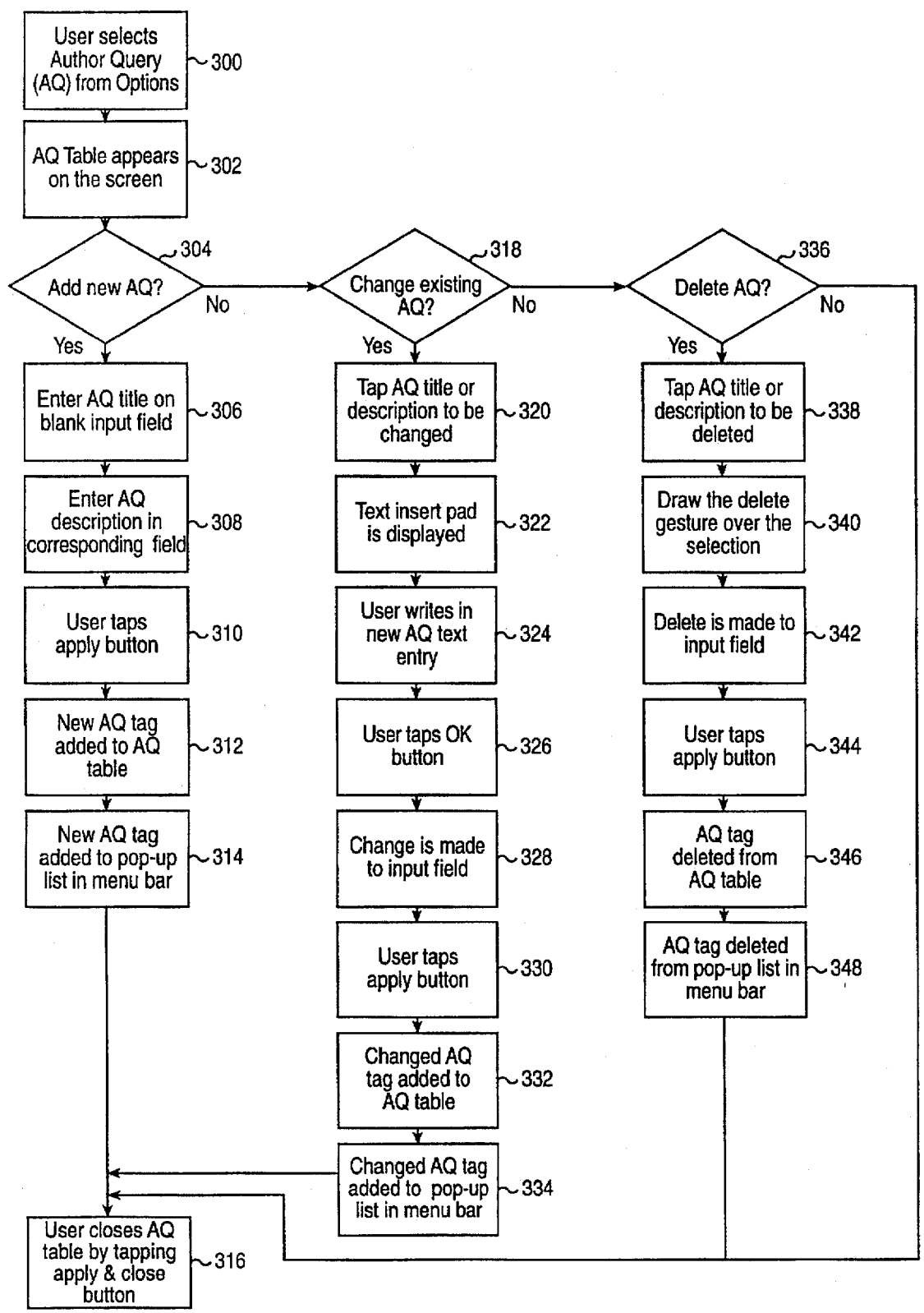
FIG. 11A shows a flow chart for building an author query table of commonly used questions.
Figure 11B:
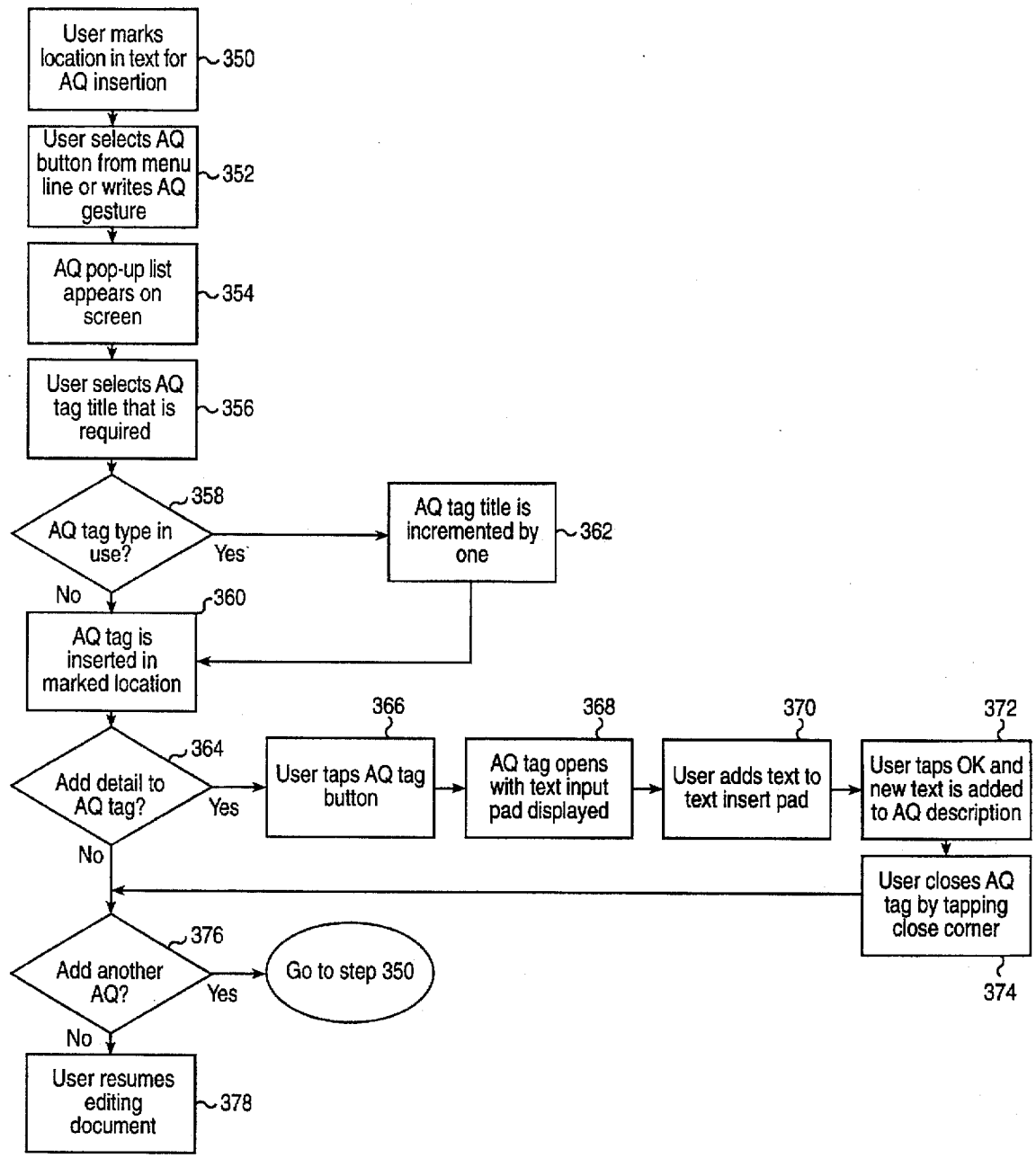
FIG. 11B shows a flow chart describing insertion of the author query (AQ) tags in a document by the copy editor.

FIG. 11A shows a flow chart for building an author query table of commonly used questions, while FIG. 11B shows a flow chart describing insertion of the author query (AQ) tags in a document by the copy editor.

Referring first to FIG. 11A, in step 300, the user, that is, the copy editor who wants to build an author query table specific to his uses, selects the author query table from the options on the screen by tapping the same with the pen. Accordingly, in step 302, the AQ table appears on the screen. The AQ table includes a plurality of author query names or titles plus descriptions of the same. For example, a copy editor will oftentimes question an author regarding a date in a reference. As an example, if there is a reference to a work written by William Shakespeare and the text states that it was written in the year 1990, the copy editor would want to question the author as to the date, and thereby apply an AQ tag at that point in the text. Therefore, the AQ table would include a title "DATE" and a description such as "This date is wrong. Please give correct date." Then, at a later time, the copy editor need only call up the AQ table and hit the "DATE" entry so that the title and description are inserted to correspond to that point in the text.

The copy editor has the option of adding a new author query tag to the table, changing an existing author query tag or deleting an author query tag.

Therefore, it is first determined in step 304 whether a new author query tag is to be added. If yes, the copy editor adds a new author query title on a blank input field of the table in step 306, enters an AQ description corresponding thereto in step 308 and taps an apply button on the screen in step 310, whereby a new author query tag is added to the AQ table in step 312 and a new AQ tag is added to a pop-up list in the menu bar in step 314. The latter step permits the copy editor to later tap on a button or the like created in the menu bar so to insert one of the AQ tags at a particular point in the text, as will be discussed hereinafter.

Thereafter, the user closes the author query table by tapping on an apply and close button, in step 316. Although not shown in the flow chart, it will be appreciated that the copy editor would be given the opportunity to return to step 304 for further changes, or to change an existing author query tag or delete an author query tag.

If the answer in step 304 is no, the copy editor is questioned as to whether an existing AQ tag should be changed in step 318. If yes, the copy editor taps the AQ title or description from the list in the table, in step 320, whereupon a text insert pad is displayed in step 322. The text insert pad is similar to the pad shown in FIG. 7. The copy editor then writes in the new AQ text entry, that is, the new title and/or description, in step 324 and taps an "OK" button in step 326, whereupon a change is made to the input field of the table in step 328. Then, the user taps an apply button in step 330, whereupon the changed AQ tag is added to the author query table in step 332 and the changed AQ tag is added to the pop-up list in the menu bar in step 334, in the manner described above. As discussed above, although not shown in the flow chart, it will be appreciated that the copy editor would be given the opportunity to return to step 304 for further changes, that is, for adding a new author query to the table, changing an existing author query tag or deleting an author query tag.

If the answer to step 318 is no, the process continues to step 336, where the copy editor is asked whether an AQ tag should be deleted. If yes, the copy editor taps the AQ title or description to be deleted in step 338, and draws a delete gesture over the selection in step 340, for example, the gesture "X" for deleting a word. The portion of the input field corresponding to that AQ tag is then deleted in step 342. The copy editor then taps the apply button in step 344, whereupon the AQ tag is deleted from the AQ table in step 346 and also deleted from the pop-up list from the menu bar in step 348.

Now, with the author query table constructed, the copy editor can easily insert AQ tags in the text during the editing operation, as will now be described in detail in connection with the flow chart of FIG. 11B.

As shown therein, when a copy editor is editing text and comes to a point where he must insert an author query, the copy editor first marks the location in the text where the author query is to be inserted, in accordance with step 350. The copy editor can insert an author query at that location in two different ways, as shown in step 352. First, the copy editor can select or tap the AQ button "AuQury" from the menu line which is situated below the text, as shown in FIG. 11. Secondly, there are a number of gestures in the different pen-operating systems, and one of the gestures could be used to indicate that an author query is desired. In such case, the copy editor would merely write the AQ gesture.

In either case, in step 354, an author query pop-up list appears on the screen, which includes a list from the AQ table of FIG. 11A. The copy editor then selects the AQ title, for example, "DATE" that is required, in step 356. It is next determined in step 358 whether this particular AQ title has previously been used in this document. If no, an AQ tag is inserted in the marked location in step 360. For example, the AQ tag might refer to "DATE". If the answer to step 358 is yes, the title for that AQ tag is incremented by one in step 362, so that the title associated with that AQ tag, for example, would be "DATE 1", whereupon the process goes to step 360.

After the AQ tag is inserted in the marked location in the text, it is determined in step 364 whether any further description should be added to the AQ tag for this particular instance. If yes, the copy editor again taps the AQ tag button in step 366, and a pad (similar to FIG. 7) containing the full description opens in step 368. The copy editor then adds text to the description in the text input pad in step 370 and taps the "OK" button in step 372, whereupon the new text is added to the description. The copy editor then closes the AQ tag by tapping on the "close" button in a corner of the screen in step 374.

Thereafter, it is determined whether to add another AQ tag to the text, in step 376. It is noted that, if the answer to step 364 is no, the process automatically continues to step 376. If the answer to step 376 is yes, the process returns to step 350, and if no, the process continues to step 378 where the copy editor resumes editing the document.

In addition to the above, references in the text, such as shown on line 4 of the screen display of FIG. 11, can be checked by utilizing a split screen. Specifically, the copy editor can look at a separate reference list and search the text and then check off each reference. A more detailed description of this function is given with respect to FIGS. 19A and 19B hereinafter.

Further, footnotes can also be numbered automatically. When auto footnote numbering is selected, any new footnote added will cause the footnotes following it to be renumbered. When the job is finalized, the footnote numbers are then locked into the file.

Figure 13:
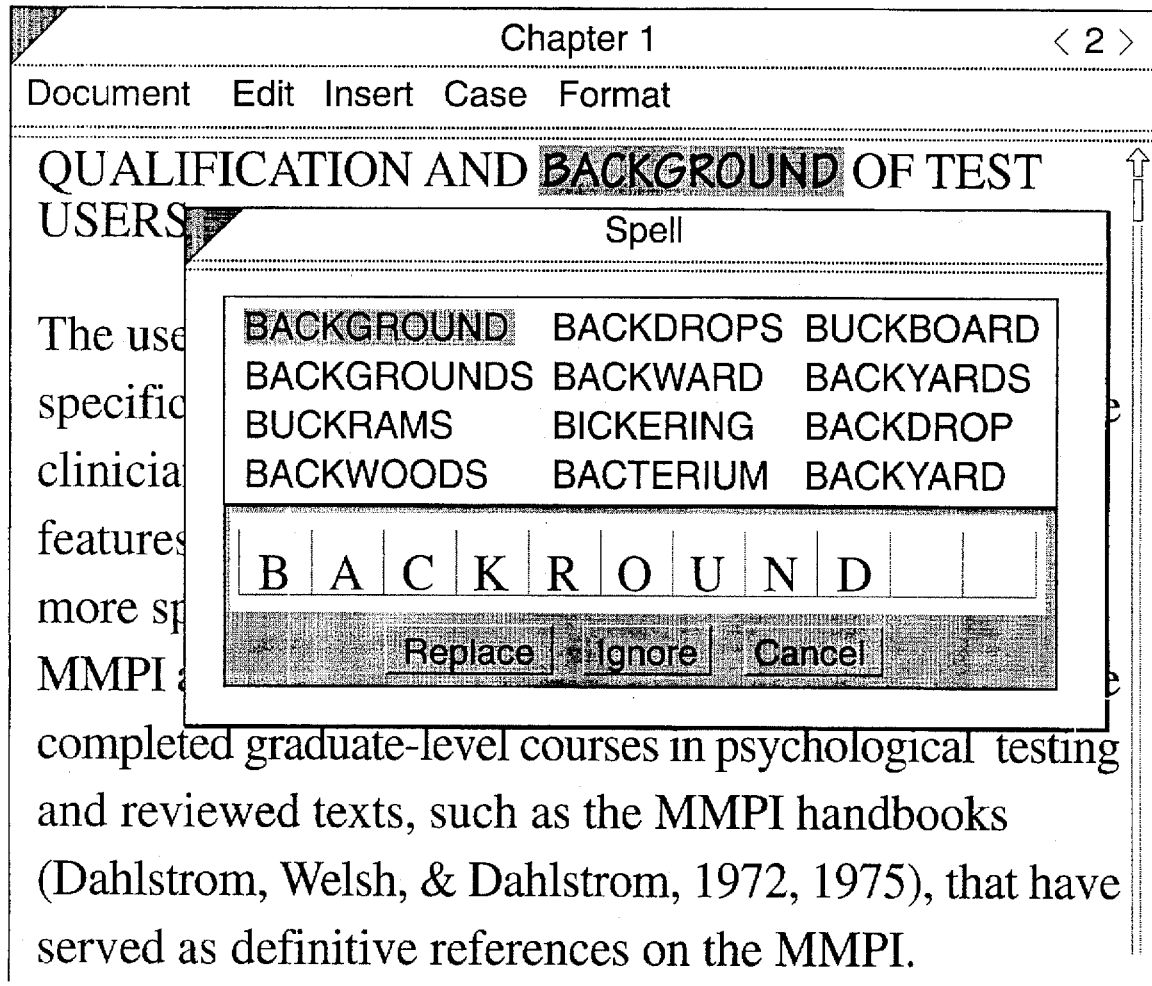
FIG. 13 is a plan view of a screen display showing the spell check operation.

The fact that the manuscript is being copy edited electronically also allows the full use of computing, such as search and replace, spell check, electronic dictionaries and thesaurus, and easy movement of blocks of text throughout the manuscript by means of the gesture "!". This allows for a quicker and better copy editing job. For example, as shown in FIG. 13, when "S" is written on screen 16, the document enters the spell check operation. When a word that is spelled incorrectly is found, a group of correctly spelled words that are close in spelling to the misspelled word appear on the screen, along with a writing pad. The copy editor has the option of tapping the pen on one of the words from the group or writing in the correct word, whereupon the replacing word appears in a handwritten font for easy viewing by the author.

In accordance with another aspect of the present invention, it is noted that a copy editor will also mark up the style elements as they would on paper. By inserting a circled one in front of a "level one head", and a circled "ext" in front of an extract, copy editing apparatus 10 will convert these user definable codes into a fully recognizable tag for typesetting. This aspect of the invention is shown in FIG. 14. These correspond to the aforementioned markings that the copy editor normally marks adjacent, for example, the chapter headings, to indicate how they will print. These markings are conventionally contained within a circle. For example, adjacent the heading for chapter 1 and in the left margin of FIG. 14, there is shown a mark with the letters Ct inside a circle to indicate a standardized style for the chapter title which includes type face, point size, bold, capitals, centering and the like. This aspect of the invention is very important, as will be appreciated from the discussion hereinafter. Specifically, this aspect of copy editing apparatus 10 offers publishers a substantial savings when sending the disks for typesetting.

Figure 14A:
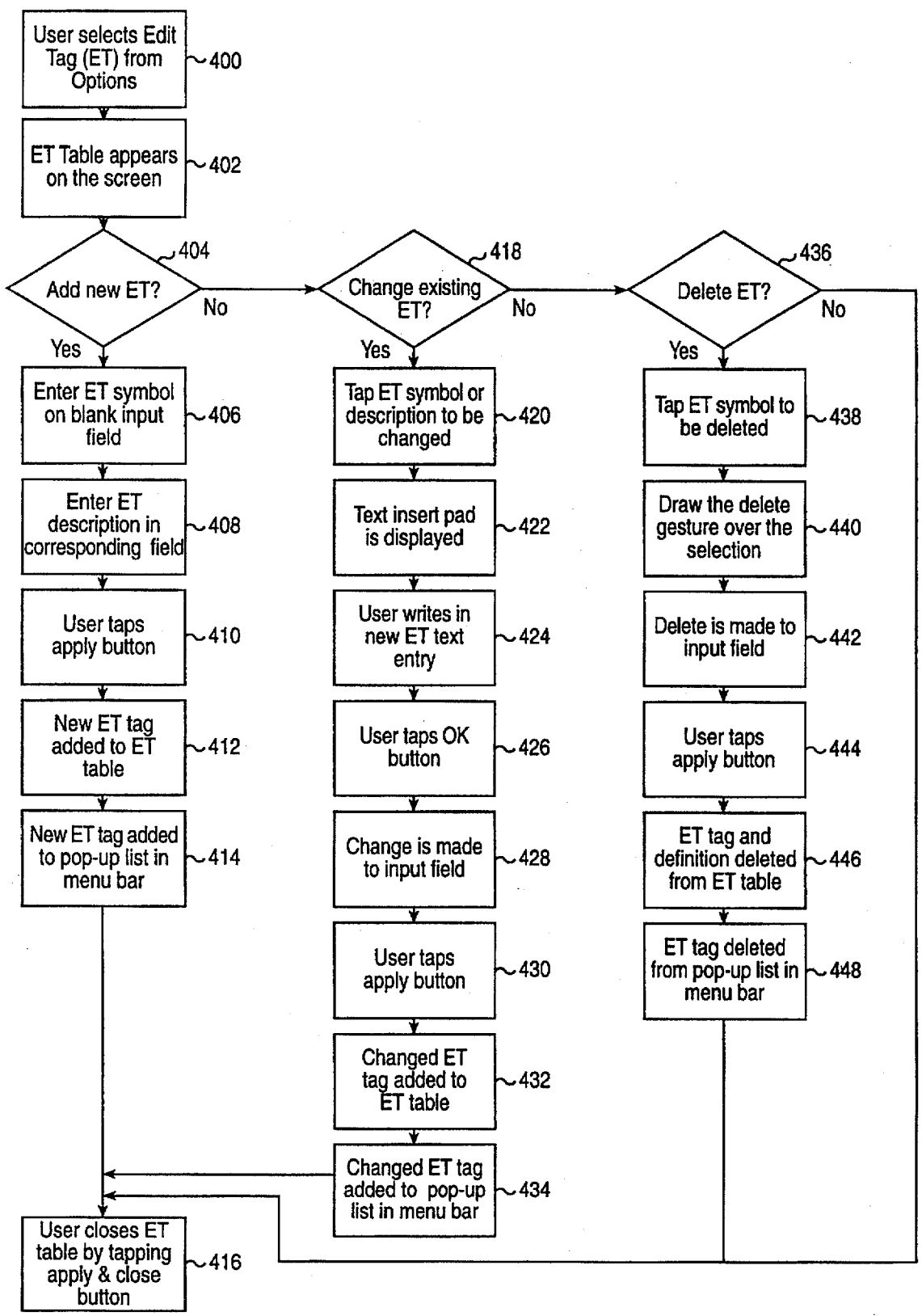
FIG. 14A shows a flow chart for building an edit tag table of commonly used edit tags.
Figure 14B:
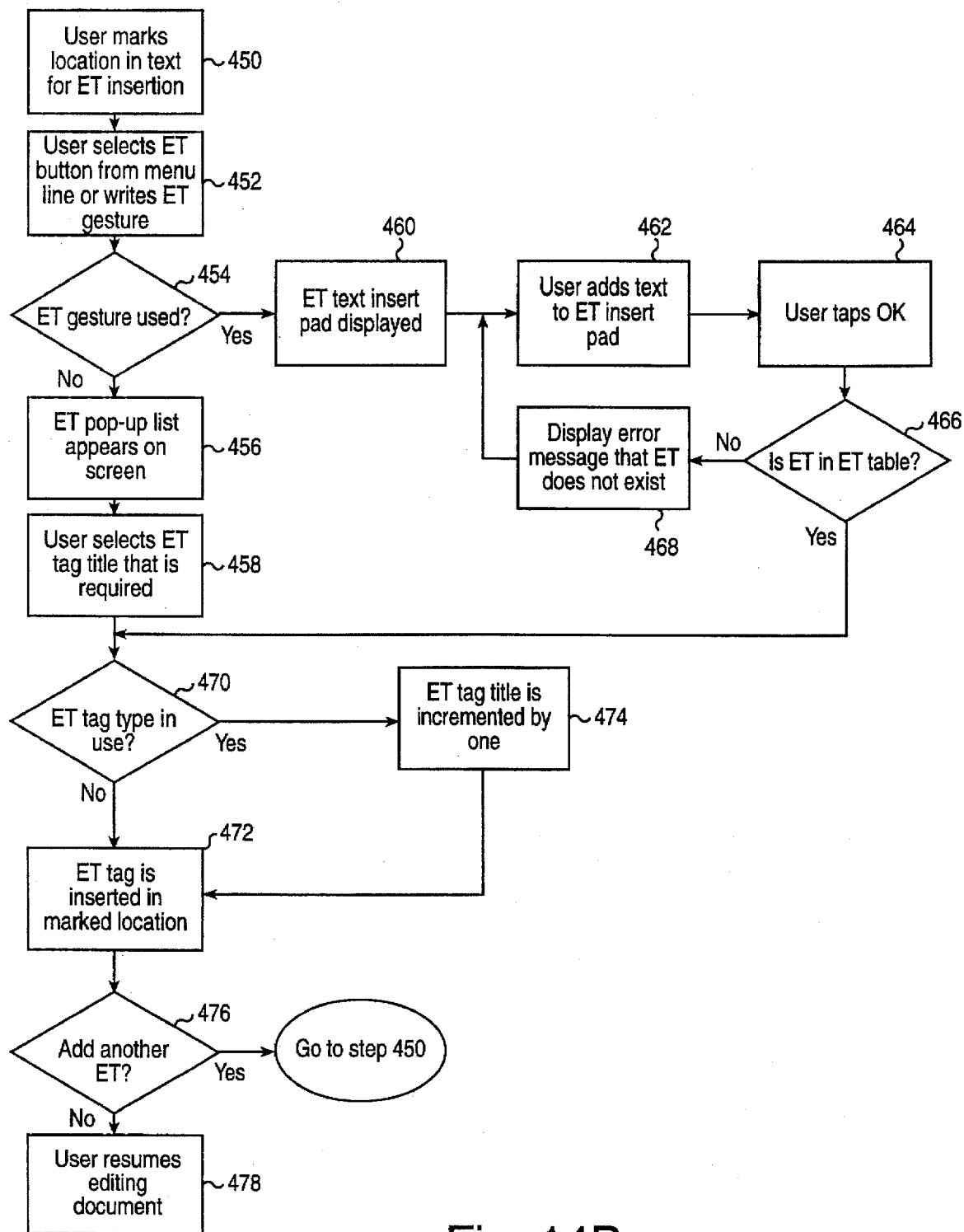
FIG. 14B shows a flow chart describing insertion of the edit tags in a document by the copy editor.

FIG. 14A shows a flow chart for building an edit tag table of commonly used edit tags for this purpose, while FIG. 14B shows a flow chart describing insertion of the edit tags in a document by the copy editor.

Referring first to FIG. 14A, in step 400, the user, that is, the copy editor who wants to build an edit tag table specific to his uses, selects the edit tag table from the options on the screen by tapping the same with the pen. Accordingly, in step 402, the edit tag table appears on the screen. The edit tag table includes an edit tag name or title plus a description of the same. For example, an edit tag title could be "CN" which would refer to information as to whether the text should be bold, the font, the font size and other typesetting codes.

The copy editor has the option of adding a new edit tag to the table, changing an existing edit tag or deleting an edit tag.

Therefore, it is first determined in step 404 whether a new edit tag is to be added. If yes, the copy editor adds a new edit tag symbol on a blank input field of the table in step 406, enters an edit tag description corresponding thereto in step 408 and taps an apply button on the screen in step 410, whereby a new edit tag is added to the edit tag table in step 412 and a new edit tag is added to a pop-up list in the menu bar in step 414. The latter step permits the copy editor to later tap on a button or the like created in the menu bar so to insert one of the edit tags at a particular point in the text, as will be discussed hereinafter.

Thereafter, the user closes the edit tag table by tapping on an apply and close button, in step 416. Although not shown in the flow chart, it will be appreciated that the copy editor would be given the opportunity to return to step 404 for further changes of adding a new edit tag to the table, changing an existing edit tag or deleting an edit tag.

If the answer in step 404 is no, the copy editor is questioned as to whether an existing edit tag should be changed in step 418. If yes, the copy editor taps the edit tag symbol or description from the list in the table, in step 420, whereupon a text insert pad is displayed in step 422. The text insert pad is similar to the pad shown in FIG. 7. The copy editor then writes in the new edit tag text entry, that is, the new title and/or description, in step 424 and taps an "OK" button in step 426, whereupon a change is made to the input field of the table in step 428. Then, the user taps an apply button in step 430, whereupon the changed edit tag is added to the edit tag table in step 432 and the changed edit tag is added to the pop-up list in the menu bar in step 434, in the manner described above. As discussed above, although not shown in the flow chart, it will be appreciated that the copy editor would be given the opportunity to return to step 404 for further changes of adding a new edit tag to the table, changing an existing edit tag or deleting an edit tag.

If the answer to step 418 is no, the process continues to step 436, where the copy editor is asked whether an edit tag should be deleted. If yes, the copy editor taps the edit tag title or description to be deleted in step 438, and draws a delete gesture over the selection in step 440, for example, the gesture "X" for deleting a word. The portion of the input field corresponding to that edit tag is then deleted in step 442. The copy editor then taps the apply button in step 444, whereupon the edit tag is deleted from the edit tag table in step 446 and also deleted from the pop-up list from the menu bar in step 448.

Now, with the edit tag table constructed, the copy editor can easily insert edit tags in the text during the editing operation, as will now be described in detail in connection with the flow chart of FIG. 14B.

As shown therein, when a copy editor is editing text and comes to a point where he must insert an edit tag, the copy editor first marks the location in the text where the edit tag is to be inserted, in accordance with step 450. The copy editor can insert an edit tag at that location in two different ways, as shown in step 452. First, the copy editor can select or tap the edit tag button from the menu line which is situated below the text, in a similar manner to the buttons shown in FIG. 11. Secondly, a gesture can be assigned to each edit tag. In this operation, the user writes an edit tag gesture "t" at the point of insertion, and an edit tag insert pad opens up. Then, the user writes the edit tag or its gesture in the writing pad. For example, when the user writes the gesture "CN" this would indicate a certain edit tag. In such case, the copy editor would merely write the edit tag gesture. In other words, if the copy editor knows the particular edit tag gesture, he need not use the pop-up list, but can merely write the edit tag gesture. In either case, the edit tag is differentiated from text by encapsulation similar to circling it.

It is next determined whether the edit tag gesture has been used, in step 454, for example, whether the copy editor has written the gesture "CN" instead of calling for the edit tag list. If no, an edit tag pop-up list appears on the screen in step 456, which includes a list from the edit tag table of FIG. 14A. The copy editor then selects the edit tag title that is required, in step 458.

On the other hand, if an edit tag gesture is used, the answer to step 454 is yes, whereupon an edit tag text insert pad, similar to the one shown in FIG. 7, is displayed in step 460, and the copy editor can add text to the edit tag insert pad in step 462 corresponding to that edit tag. For example, the copy editor may want to modify the edit tag by using all of the attributes thereof except a different font size. Thereafter, the copy editor taps the "OK" button in step 464. It is next determined if the edit tag that is to be modified is in the edit tag table in step 466, since it cannot be modified otherwise. If no, a display error message appears in step 468, whereupon the process returns to step 462. If yes, the process continues to step 470, which is also the step following step 458.

In step 470, it is determined whether this particular edit tag title has previously been used in this document. If no, an edit tag is inserted in the marked location in step 472. For example, the edit tag might be CN. If the answer to step 470 is yes, the title for that edit tag is incremented by one in step 474, so that the title associated with that edit tag, for example, would be "CN 1". whereupon the process goes to step 472.

Thereafter, it is determined whether to add another edit tag to the text, in step 476. If the answer to step 476 is yes, the process returns to step 450, and if no, the process continues to step 478 where the copy editor resumes editing the document.

Further, with the present invention, an indexing program allows author's names, words, and phrases to be flagged during copy editing, so that when finally paginated, the author's names, words and/or phrases could be automatically indexed. A separate index manuscript is then created for the insertion of added index elements, Which is then code embedded into the text with a hidden indexing coding, thereby offering a savings in indexing time and cost.

Figure 15:
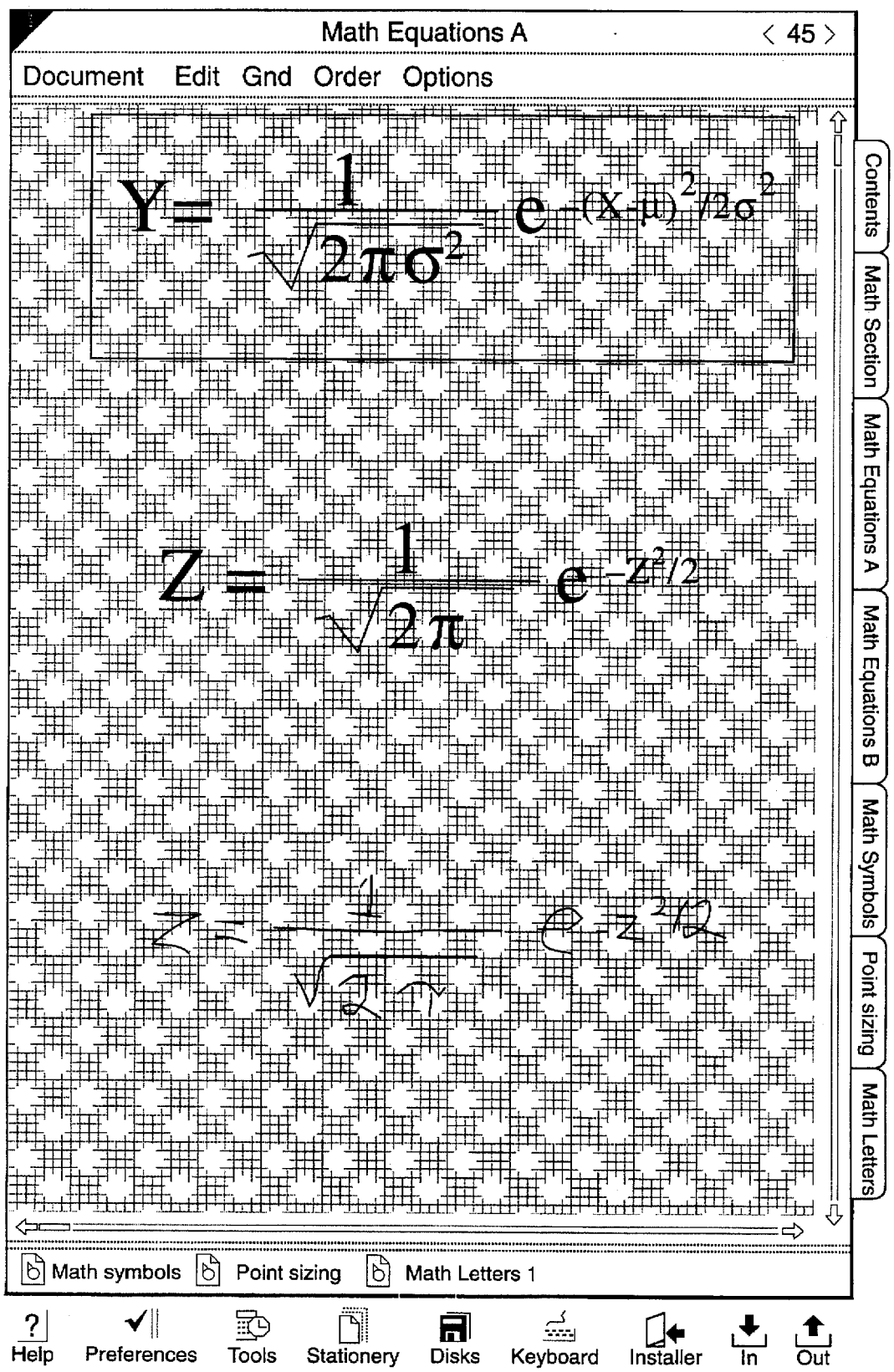
FIG. 15 is a plan view of a screen display showing the chemical formula and equation creating operation.

In accordance with another aspect of the present invention, math and chemical equations can be created by writing and drawing them as needed. First, the user defines specific sizes for the various elements in math or chemistry. Then, copy editing apparatus 10 is trained to recognize the symbols, or alternatively, pop-up menus can be used to insert symbols. Then, the math or chemical equation is drawn, as shown in FIG. 15, and copy editing apparatus 10 automatically converts the handwritten elements into high quality (typeset) bit-mapped images. The images can then be converted to an SGML coded file.

When the manuscript is fully copy edited with copy editing apparatus 10, a laser printout of the manuscript is made. The printout first shows author queries, listed by page number and query number for each chapter, followed by the chapter text with all element coding and all inserts and changes in a handwritten font and all deletions in a scratch-out font similar to a paper-edited manuscript. As a result, the printed manuscript is much more organized and easier to understand than a normal paper-edited manuscript. Further, printing to a color laser printer can produce edits in different colors, or for multiple levels of edits, different colors can specify the different levels.

As in a conventional manner, the author then reviews the printout of the revised manuscript, by marking any changes and answering any queries directly on the laser printed copy of the author query sheet. The author then returns the manuscript to the production editor.

The production editor then gives the marked up document back to the copy editor, who incorporates any last-minute changes in view of the author's further changes and/or the author's answers to author queries. The copy editor makes any further changes that he deems appropriate.

It will be appreciated from the above discussion that copy editing apparatus 10, unlike conventional pen editing systems, folios the manuscript, automatically breaking the manuscript into pages for copy editing. This page relational system allows copy editing apparatus 10 to re-break the pages of the manuscript when new text is added, while maintaining the original page numbering system, that is, the original pages can be locked as to page number and any new text added will cause the pages to be lengthened and scroll and not effect the following page breaks so that any added matter, although adding to the page, will not change the page numbering. In other words, any changed text will be on the same page and thereby match the printed manuscript, for easy editing. Pages that are then printed will be folioed with the page numbers followed by a letter or letters, such as 23a, 23b, 23c and so on for different sub-pages.

Figure 5A:
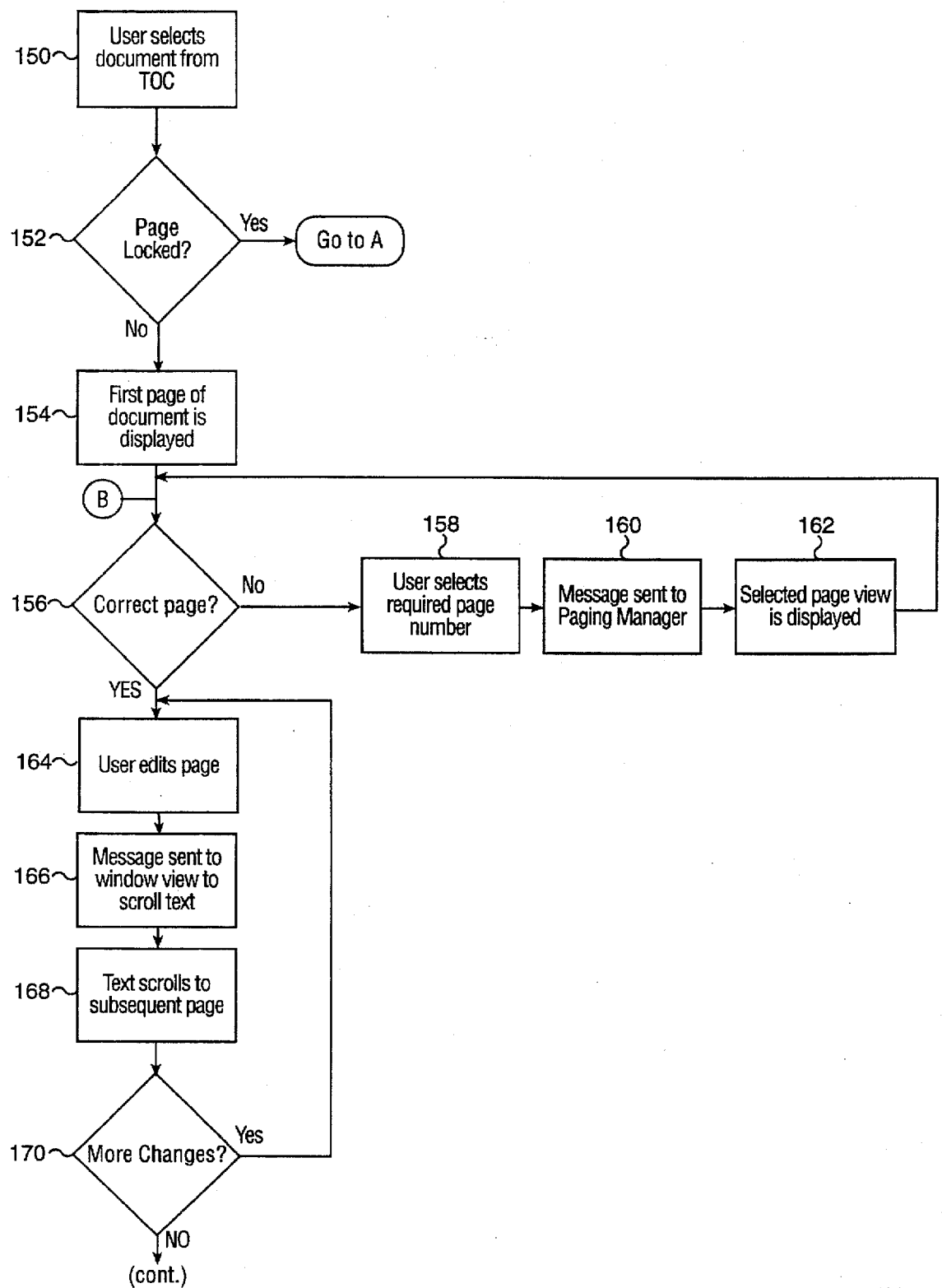
FIGS. 5A and 5B constitute a flow chart diagram used for explaining the operation of the page locking operation according to the present invention.
Figure 5B:
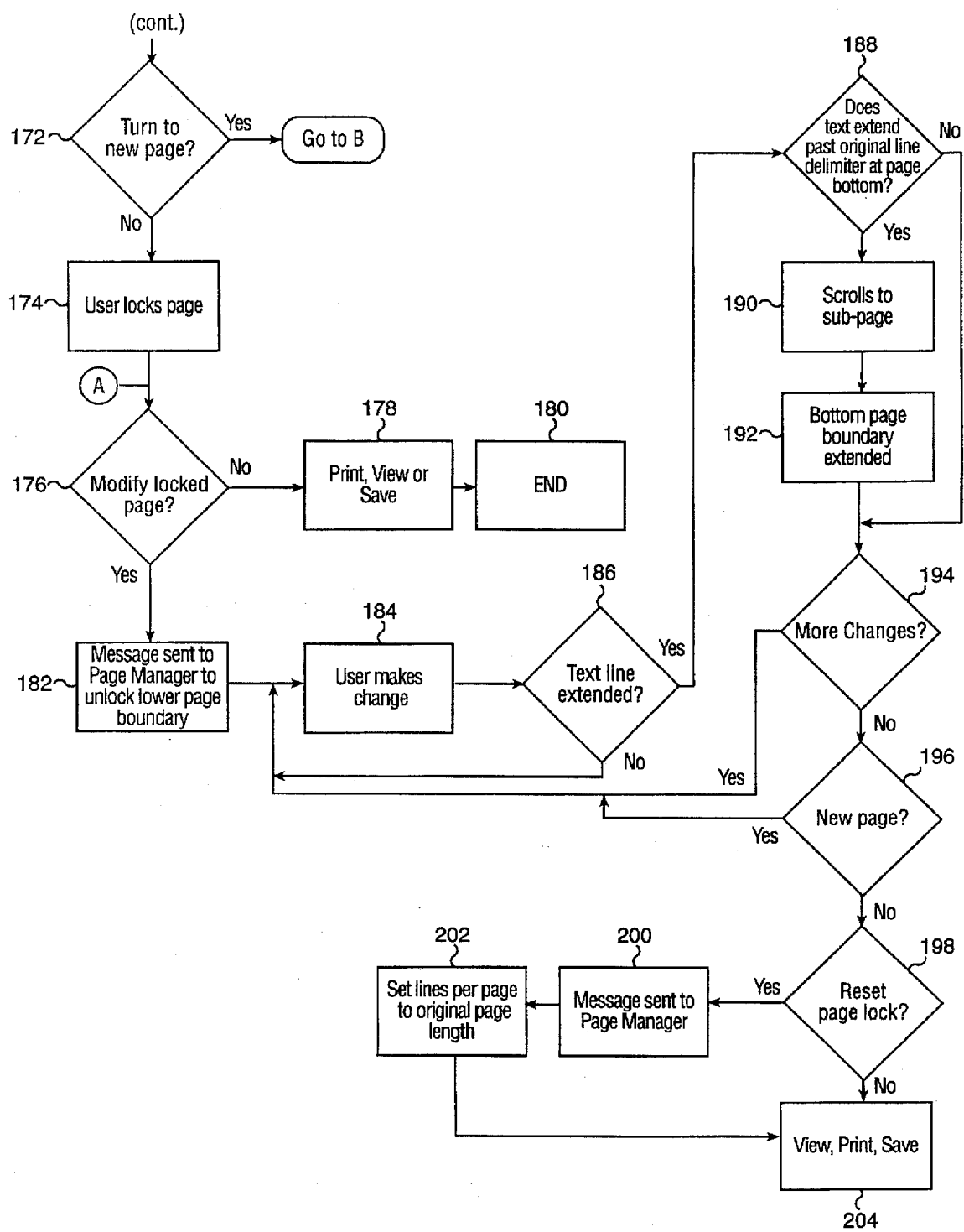

This operation is best shown by reviewing FIGS. 5A and 5B which show a flowchart diagram for the same. As shown therein, a user, namely the copy editor, first selects a document from the table of contents in step 150. Then, it is determined whether the pages are locked in step 152, that is, whether the addition of text to a page will prevent scrolling of the text at the bottom of the page from leaping to the next numbered page. When the copy editor reviews the manuscript as described above for the first time, the pages are not locked, and accordingly, in step 154, the first page of the document is displayed. This position is denoted by position B in FIG. 5A. The computer than queries the copy editor in step 156 whether the first page is the correct page, that is, the page which is desired by the copy editor. If not, in step 158, the copy editor answers in the negative and then selects the required page number. A message is then sent to the paging manager in step 160 and the selected page to be viewed is displayed in step 162. Thereafter, the process returns to position B, that is, to step 156.

If the correct page is now displayed, the copy editor answers yes in step 156, and the process proceeds to step 164 whereby the copy editor edits the page. As text is added, a message is sent to scroll text in step 166. As the text exceeds a page, it scrolls to a subsequent numbered page in step 168. Since the page numbers are not locked, the system functions in the same manner as a conventional word processing program with respect to the scrolling operation when adding and deleting text. If more changes are to be made on the selected page, as noted in step 170, the process returns to step 164.

If no further changes are to be made on that page, the copy editor is then queried in step 172 as to whether a new page should be displayed. If yes, the process returns back to step 164. If no, the initial editing operation is deemed to be completed, whereby the computer locks the pages in step 174, with the process at position A. This is performed by the copy editor after the initial review of the manuscript before it goes to the author for review.

However, when the pages are locked, and when the copy editor reviews the document after receiving it back from the author, each page is viewed almost like a separate document, so that any future changed text will be on the same page and thereby match the printed manuscript. Pages that are then printed will be folioed with the page numbers followed by a letter or letters, such as 23a, 23b, 23c and so on. It is noted that the locking operation can occur automatically upon saving of the document and/or by querying the copy editor as to whether the pages should be locked at this point. Returning back to step 152, if it is determined that the pages are locked, the process jumps to position A, that is, to step 176.

Thereafter, the computer asks the copy editor whether the locked pages should be further edited in step 176. If not, the computer can print, view and/or save the document in step 178, whereby the process is ended in step 180.

On the other hand, if the locked pages are to be further modified, a message is sent to the page manager to unlock the lower boundary of the page to be edited, in step 182. In other words, although each page is locked, the text on that particular page can scroll onto further sub-pages. For example, if the lower boundary or line delimiter of a page is the 40th line, any text on page 2 will spill or scroll over to the next sub-page 2a, and so on, thereby retaining the same page numbers due to page locking. This is necessary if text is to be added, since the pages are locked. In actuality, the sub-pages are only for printing out the manuscript, but a single long page is really provided inside the computer.

Thereafter, the copy editor makes any changes in the text, in step 184. After each change, the computer determines in step 186 whether the text line is extended. If not, the process returns to step 184 for further changes. If yes, however, the computer determines whether the text now extends past the original line delimiter or lower boundary at the page bottom, in step 188. If yes, it is necessary to scroll to the next sub-page, for example, page 2a, 2b and so on, in step 190. It will be appreciated, however, that a new page is not actually created (except for printing), so that the bottom page boundary or line delimiter is thereby extended in step 192 to account for the added text. Thereafter, the process determines if more changes are to be made, in step 194. It is noted that if the response to step 188 is in the negative, such that the page length is not extended, the process jumps over steps 190 and 192 to step 194.

If further changes are to be made, the process returns back to step 184. If no further changes are to be made, the process continues to step 196, where the copy editor is asked whether to go to a new page for editing. If yes, the process returns again to step 184. If no, the process continues to step 198.

In step 198, the copy editor has the option to reset the page lock. In other words, the copy editor can instruct the computer to repaginate so that all pages have the original boundary line. For example, if the original page delimiter was forty lines per page, after the editing process and because of the sub-pages, various pages, that is, those with sub-pages, could include more than forty lines. By resetting the page lock, all of the text would be repaginated so that all of the pages would have forty lines, and so that there are no sub-pages.

Thus, if the answer is yes to step 198, a message is sent in step 200 to the page manager, which sets the lines per page to the original page length, in step 202. Thereafter, the process continues to step 204, where the text can be viewed, printed and/or saved. If the answer is no, the process merely continues to step 204, so that the page lock is still on, and there are still sub-pages.

As discussed above, any page breaks remain in the text. For example, if five pages of text are added to page 2, the original page is numbered 2a and the additional five pages are numbered 2b–2f. This makes author review very easy.

Further, the copy or production editor will check the author references in the text against a separate author reference (AR) list which is provided in a separate document or list in the computer. Generally, when the author submits the text, he will provide a separate list of author references which appears in the text. In such case, the text will only include an abbreviated version of the author reference. For example, AR 1 on the list might read "Robinson, "Practical Digital Design", Journal of Electronic Design, Vol. XX, Pages 10–20, 1991", while the rotation in the text may read "Robinson (1991)". Therefore, it is necessary for the editor to correct any errors in the author reference list, and to also ensure that all references in the author reference list are found in the text. For example, during the editing process, the paragraph containing "Robinson (1991)" may have been deleted. In such case, the author reference list would have to be modified.

Figure 19A:
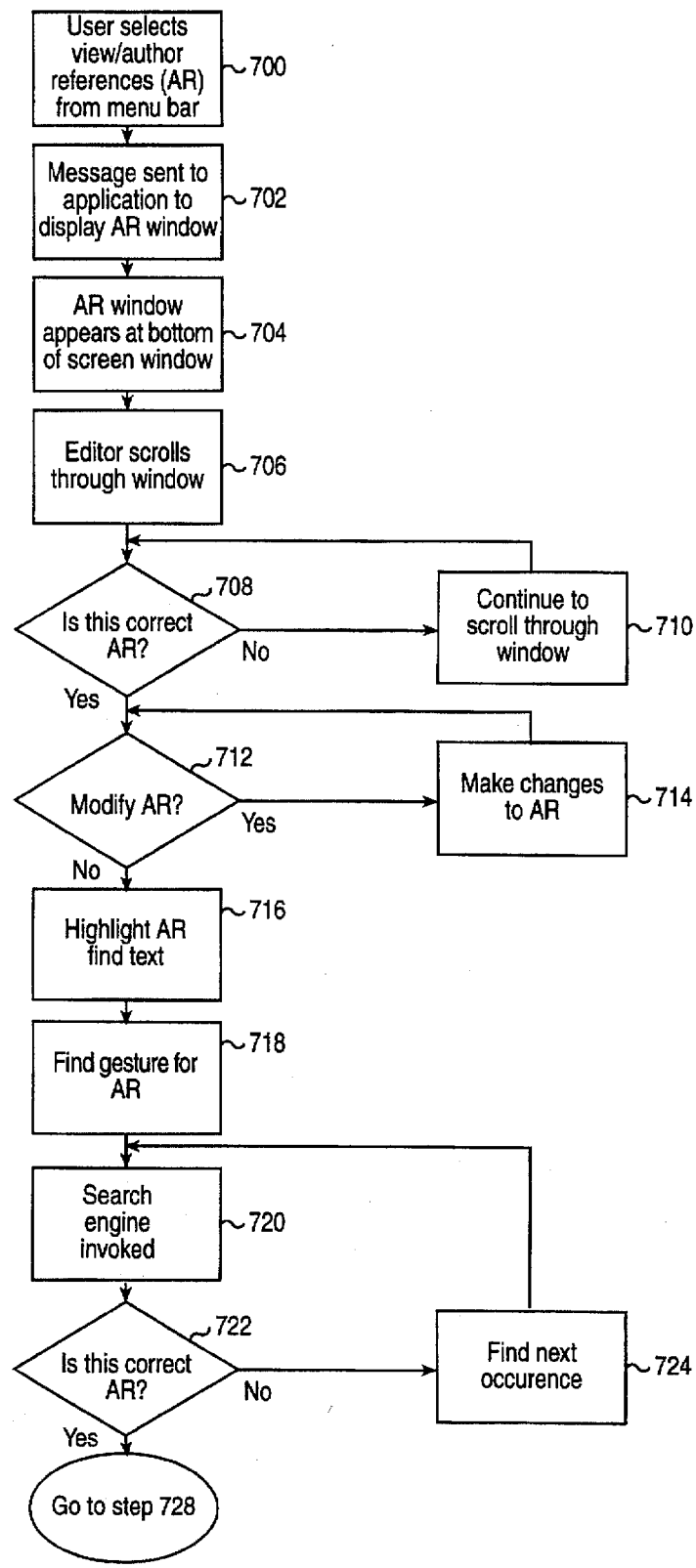
FIGS. 19A and 19B show a flow chart for checking and modifying author references.
Figure 19B:
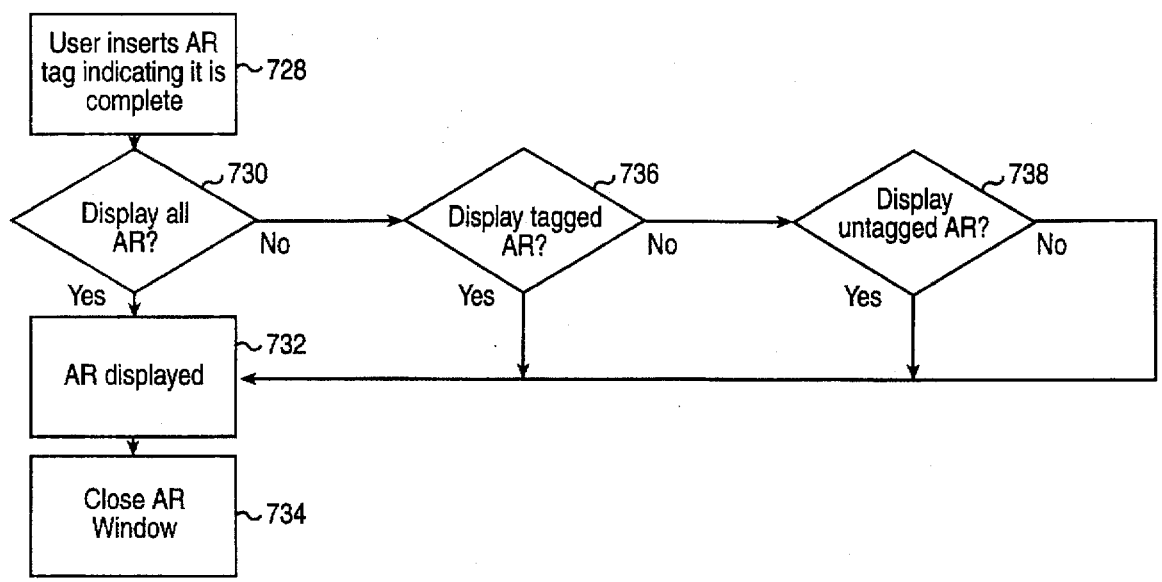

In this regard, and referring to FIGS. 19A and 19B, there is shown a flow chart for checking and modifying author references.

Specifically, with the document opened, the editor first selects the view AR button from the menu bar in step 700, whereby a message is sent to display the AR window in step 702, and the AR window appears at the bottom of the screen in step 704. In other words, there is a split screen, with the text displayed in the top window and the AR list displayed in the bottom window. The editor then scrolls through the bottom window of the AR list in step 706. It is determined by the editor whether the correct author reference, that is, the author reference to be checked, has been reached in step 708. If not, the editor continues to scroll through the lower window in step 710 until the correct author reference has been reached. The editor can alternatively use the find function "F" of the pen computing system to find a specific author reference.

At this time, the author can make changes to the author reference in the list. For example, the spelling of a word can be corrected, the order of information in the reference can be changed, and the like. Therefore, if the editor desires to make changes as determined in step 712, changes are made in step 714. If no further changes are made to this author reference, the editor highlights a portion of the author reference, for example, the name "Robinson" in step 716, and uses the find gesture of the pen operating system in step 718 to find the occurrence of that name in the upper window of the text. As a result, the search engine of the pen operating system is invoked in step 720 until that name is found in the text of the upper window.

The computer then questions the editor as to whether this is the correct author reference, in step 722. If no, the computer continues searching for the next occurrence of "Robinson" in step 724. If yes, the process continues to step 728. At this point, the editor has verified that the author reference in the separate list finds at least one occurrence for support in the text. Therefore, the editor inserts an AR tag in the author reference list, in step 728, indicating that support is found in the text.

Although not shown, the editor is then given the opportunity to search other author references in the list. Once all of the author references are found, the computer gives the editor the option of displaying all author references in step 730. If yes, all author references are displayed in step 732 and the author reference window is thereafter closed in step 734. If no, the computer asks whether to display only the tagged author references in step 736. If yes, the tagged author references are displayed in step 732. If no, the computer asks whether to display only the untagged author references in step 738. If yes, the untagged author references are displayed in step 732. If no, the process continues to step 734.

In addition, the present invention includes a feature known as "cast-off". Specifically, it is desirable for the publisher to know how many pages will be present in the final version before printing of the same. Prior to the present invention, the only way to know this was to print the final manuscript with all of the typesetting codes therein. With the present invention, all of the characters, spaces, typesetting codes and the like are given a numerical value corresponding to the space to be occupied thereby in the final product. Therefore, it is only necessary for the computer to substitute the values for each character, space and typesetting code, and add up all of the values. The sum of all the values will correspond to the length of the manuscript, in accordance with experimental determinations made by the publisher.

Figure 18:
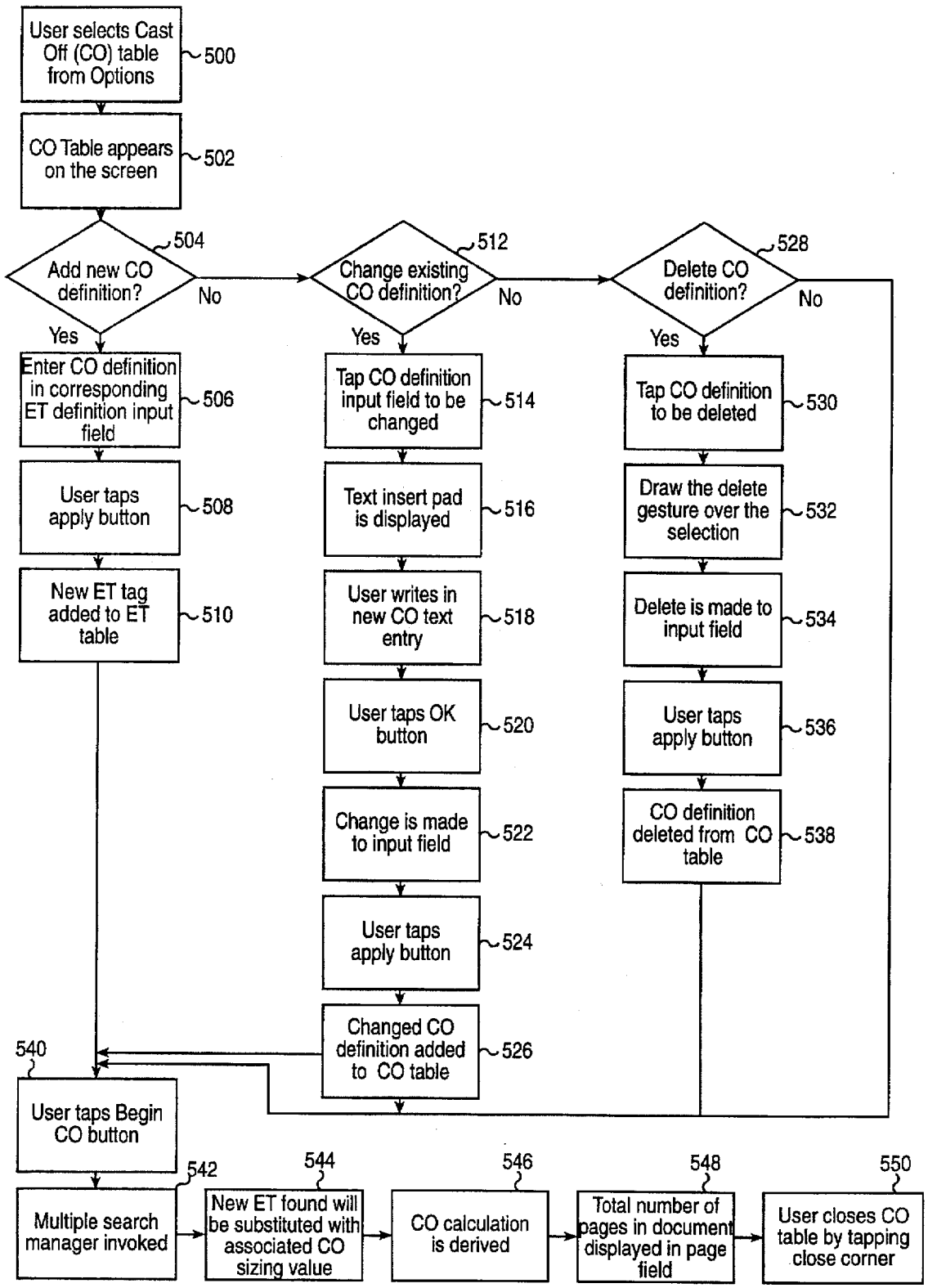
FIG. 18 shows a flow chart for changing the values of all variables and for determining the length of a manuscript according to the cast-off procedure.

FIG. 18 shows a flow chart for changing the values of all variables and for determining the length of a manuscript according to the cast-off procedure.

Referring to FIG. 18, in step 500, the user, that is, the publisher selects the cast off (CO) table from the options on the screen by tapping the same with the pen. Accordingly, in step 502, the cast off table appears on the screen. The cast off table includes a cast off name or title plus a description of the same. Specifically, the cast off table is obtained by using the edit tag table and eliminating the edit tag titles, but leaving only the edit tag definitions. Each edit tag definition is given a numerical value. Further, the cast off table includes numerical values for the different fonts and font sizes. For example, it is known that a one point font size equals 1/72 inch high. Therefore, by known use or experimentation, numerical values for the different cast off titles (edit tag definitions) are known and are formed in the table.

The publisher has the option of adding a new cast off to the table, changing an existing cast off or deleting a cast off.

Therefore, it is first determined in step 504 whether a new cast off is to be added. If yes, the publisher adds a new cast off definition in the input field of the table corresponding to the edit tag definition, in step 506, and taps an apply button on the screen in step 508, whereby a new cast off tag (edit tag definition) is added to the cast off table in step 510. Although not shown in the flow chart, the publisher is given the opportunity to return to step 504 for further changes, or to change an existing cast off definition or to delete a cast off definition.

If the answer in step 504 is no, the publisher is questioned as to whether an existing cast off tag should be changed in step 512. If yes, the publisher taps the cast off definition from the list in the table, in step 514, whereupon a text insert pad is displayed in step 516. The text insert pad is similar to the pad shown in FIG. 7. The publisher then writes in the new cast off text entry, that is, the new description, in step 518 and taps an "OK" button in step 520, whereupon a change is made to the input field of the table in step 522. Then, the user taps an apply button in step 524, whereupon the changed cast off tag is added to the cast off table in step 526. As discussed above, although not shown in the flow chart, the publisher is given the opportunity to return to step 504 for further changes.

If the answer to step 512 is no, the process continues to step 528, where the publisher is asked whether a cast off definition should be deleted. If yes, the publisher taps the cast off description to be deleted in step 530, and draws a delete gesture over the selection in step 532, for example, the gesture "X" for deleting a word. The portion of the input field corresponding to that cast off definition is then deleted in step 534. The publisher then taps the apply button in step 536, whereupon the cast off tag is deleted from the cast off table in step 538.

After all changes have made to the cast off table, the publisher taps the "Begin Cast Off" button in step 540, whereby the multiple search manager of the aforementioned global search and replace operation is invoked in step 542. As a result, an internal operation occurs whereby a numerical value is substituted for each edit tag definition in the cast off table, as well as each character and the like, in step 544. Then, all of the numerical values are summed in step 546, and from a look-up table or the like, the total number of pages that will result in the final output is obtained and displayed in step 548. Thereafter, the publisher closes the cast off table by tapping the "Close" button in the corner of the screen, in step 550.

The production editor then taps pen 19 on the "Finalize" icon at the bottom of screen 16, as shown in FIG. 14. This results in copy editing apparatus deleting any scratch-outs from the final text and converting the handwritten font into typed characters of the same font as the remainder of the text. Further, this operation eliminates any author queries and converts the style codes in FIG. 14 to predefined typesetting tags.

Figure 14C:
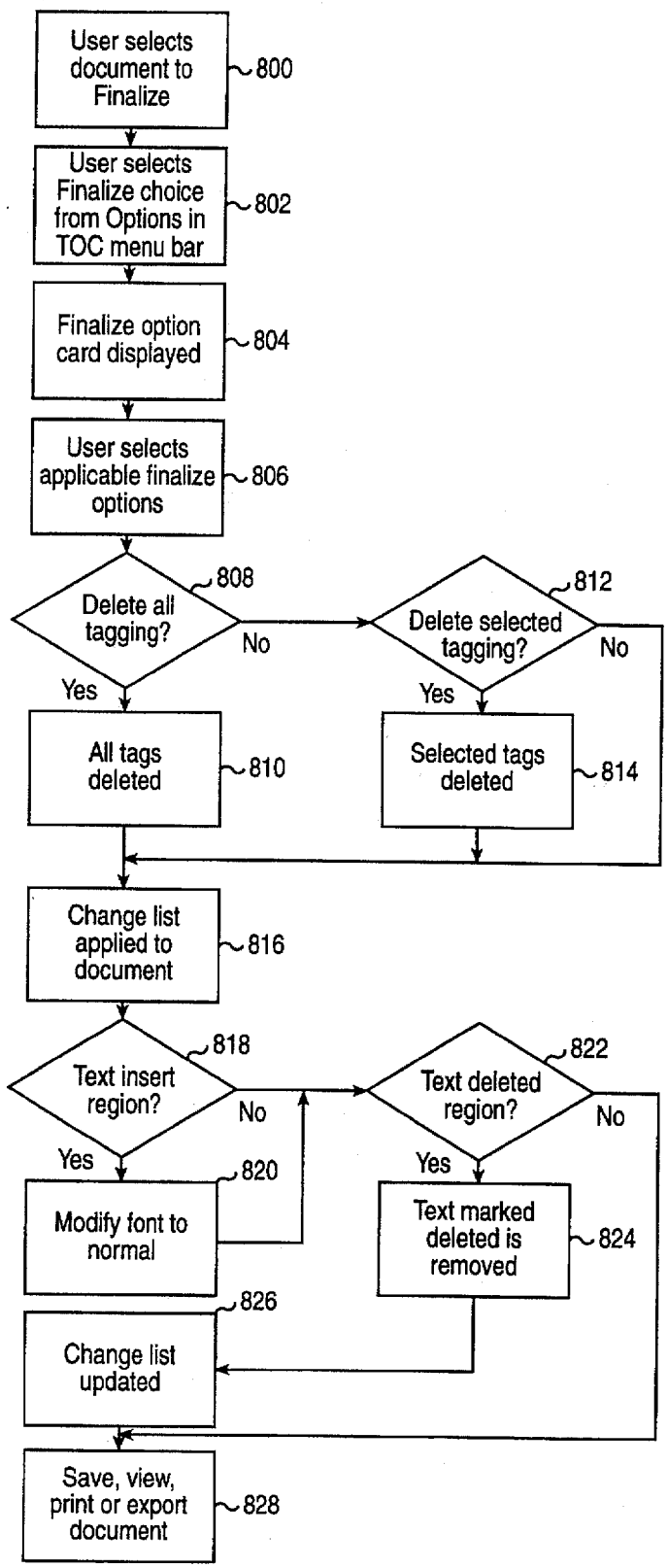
FIG. 14C shows a flow chart for the finalize operation.

FIG. 14C shows a flow chart for the finalize operation. First, in step 800, the production editor selects the document to finalize, and then in step 802, the production editor selects "Finalize" from the options in the table of contents menu bar, whereupon the finalize option card is displayed in step 804. From the finalize option card, the production editor selects applicable finalize options in step 806. Specifically, the production editor can delete all tagging, such as author query tags, edit tags and the like, or can delete only some of the tags. For example, when the document is to be sent to the author in another word processing format, all tags should be removed. On the other hand, when the document is to be finalized for typesetting, the edit tags should remain while the author query tags should be removed.

In step 808, it is determined if there is an instruction to delete all tags. If yes, all tags are deleted in step 810. If no, it is then questioned whether selected tags should be deleted in step 812. If yes, the selected tags are deleted in step 814. Once the tags are deleted, or if no tags are to be deleted, the process continues to step 816.

Before discussing step 816, it is noted that each time a change is made to the original document, a notification of that change is stored in a change list, that is, a separate list associated with that document. Therefore, in step 816, the change list is applied to the original document. It is then determined if there are any insertions in the document in step 818. If yes, the handwritten font is modified to a normal font in step 820. Thereafter, it is determined if there are any deletions in the document, in step 822. If yes, the text that is marked to be deleted is removed in step 824. Then, the process continues to step 826 where the change list is updated, and thereafter, the document can be saved, viewed, printed or exported in step 828.

It will be appreciated that even with the document in final form, the original document or any portion of the original document in any order can be reconstructed with the change list. This can be performed at any time during the editing operation. Thus, a "STET" button or gesture "E" is provided whereby any highlighted portions or any change thereof can be reverted back to the original document form. Therefore, the change list is used to produce the final document from the changed document and to produce the original document from the changed or final document. For example, by writing an "E" over a changed word, the word reverts to its original form, thereby steting the change. As another example, during the editing process, a paragraph can be highlighted and an "E" written on it to change it back to the original unedited format. This can also be performed by highlighting the text to be steted and tapping the STET button at top menu.

At this stage in the operation, the production editor will decide what form the final disk should take, for example, a coded ASCII file for typesetting, any of the numerous optional word processing programs, or standardized generalized mark-up language (SGML), all as shown in FIG. 16. For example, in coded ASCII, if there is italicized text, "<ITALIC>" will be provided at the beginning and end of the word or group of words, which a conventional typesetting machine will understand. By supplying a typesetter with fully-converted, coded, and edited disks, a publisher will receive a substantial savings of money and time in the typesetting of the publication, since no re-keyboarding is required. Further, the publisher will also receive the benefit of not having to proofread the typeset pages or to re-keyboard the manuscript twice, as aforementioned.

Figure 16A:
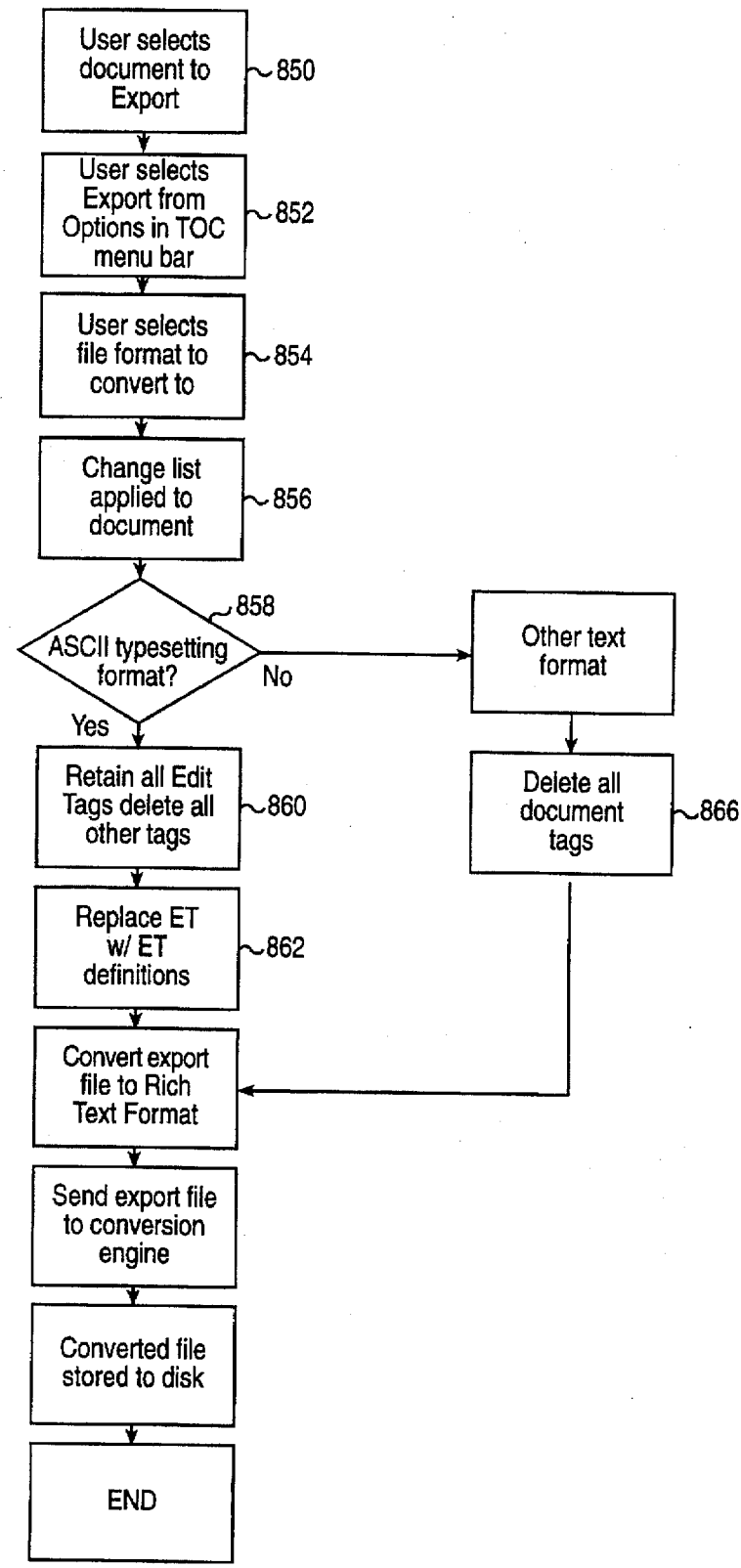
FIG. 16A shows this export function for converting the final document.

FIG. 16A shows this export function for converting the final document. The production editor, in step 850, first selects the document to be exported, and then selects "Export" from the options in the table of contents menu in step 852. The production editor then selects the file format to convert to, in step 854, whereupon the change list is then applied to the document, in step 856.

The computer determines if the file format selected is an ASCII typesetting format in step 858. If yes, all edit tags are retained, while all other tags such as author query tags are deleted, in step 860. In effect, the export process overlaps with the finalize process and uses many of the same steps, although it has been separated here for ease of explanation. Thereafter, all edit tags, that is, the symbols, are replaced by the edit tag definitions in step 862.

If, on the other hand, the ASCII typesetting format is not selected, the process continues to step 864 where it is determined that another format has been chosen. For example, if the author is using "WORDPERFECT" software, the edit tags should not be in the final document when exporting the same to this format for the author's review. Accordingly, all tags are deleted in step 866.

After the tags are deleted in steps 862 or 866, the process continues to step 868, where the file is converted to a Rich Text Format (RTF), which is a common denominator format for many formats and which is used in conventional converting processes. Then, in step 870, the RTF file is sent to the export file for conversion in step 872 and converted by conventional conversion software, such as those earlier described, in step 874. Thereafter, the process ends in step 876.

Copy editing apparatus 10 further includes a time management function which shows how much time was spent editing a job, how many changes were made in the manuscript, how many times the job was opened, how many words and how many characters are in a job. This information can be obtained by tapping on the "Time Mng" icon at the bottom of the screen, as shown in FIG. 6, although it is for viewing only and cannot be changed by the copy editor. Since the copy editor is paid by the time he spends revising the manuscript, the publisher can verify this time, and can correlate the time to the other information such as the number of changes made and the number of times the job was opened. Further, to prevent the copy editor from leaving the apparatus on while performing other work, copy editing apparatus 10 is instructed to shut off if no changes are made for a predetermined period of time, for example, for five minutes.

Figure 17A:
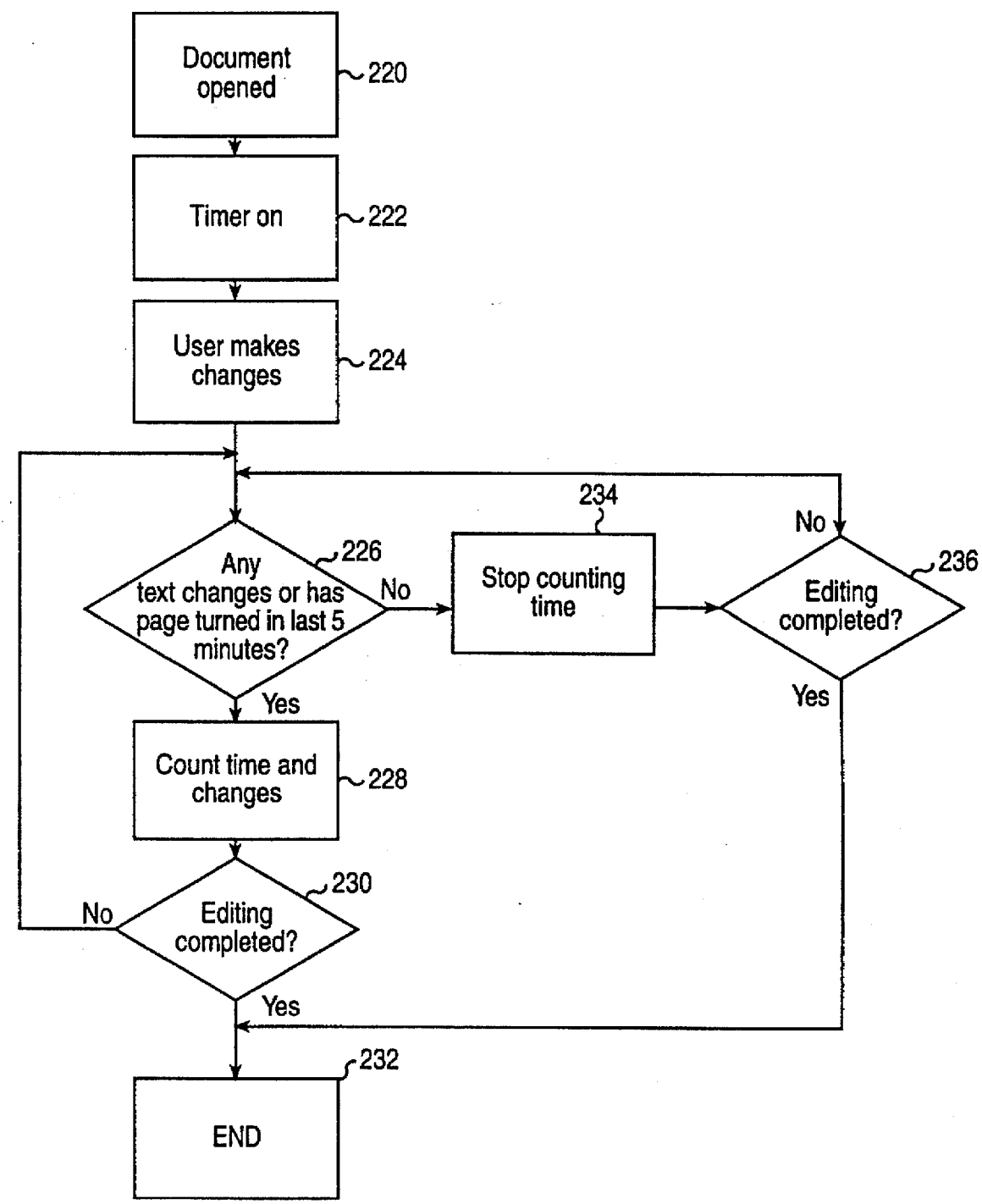
FIG. 17A shows a flow chart for keeping track of the time and editing counting operations.

Specifically, as shown in FIG. 17A, there is shown a flow chart for the time and editing counting operations. Thus, in step 220, a document is opened. At this time, a timer is actuated, as shown in step 222, whereupon the user (copy editor) will start making changes, in accordance with step 224. The computer determines in step 226, after the first five minutes, whether any text changes have been made or whether any pages have been turned in the last five minutes of operation in this document. If yes, this shows that the copy editor is working, and the time and changes are counted and stored in step 228. After each such operation, it is determined in step 230 if the editing operation is completed. If yes, the process is ended in step 232. If no, the process returns to step 226. As long as the copy editor is making changes or turning pages within a preset time, such as five minutes, the time and changes are counted and stored.

If, however, the answer to step 226 is no, the computer is instructed to stop counting in step 234. The computer then determines if the editing operation is completed in step 236, for example, by the copy editor closing the document. If yes, the process skips to step 232. If no, the process returns to step 226.

Figure 17B:
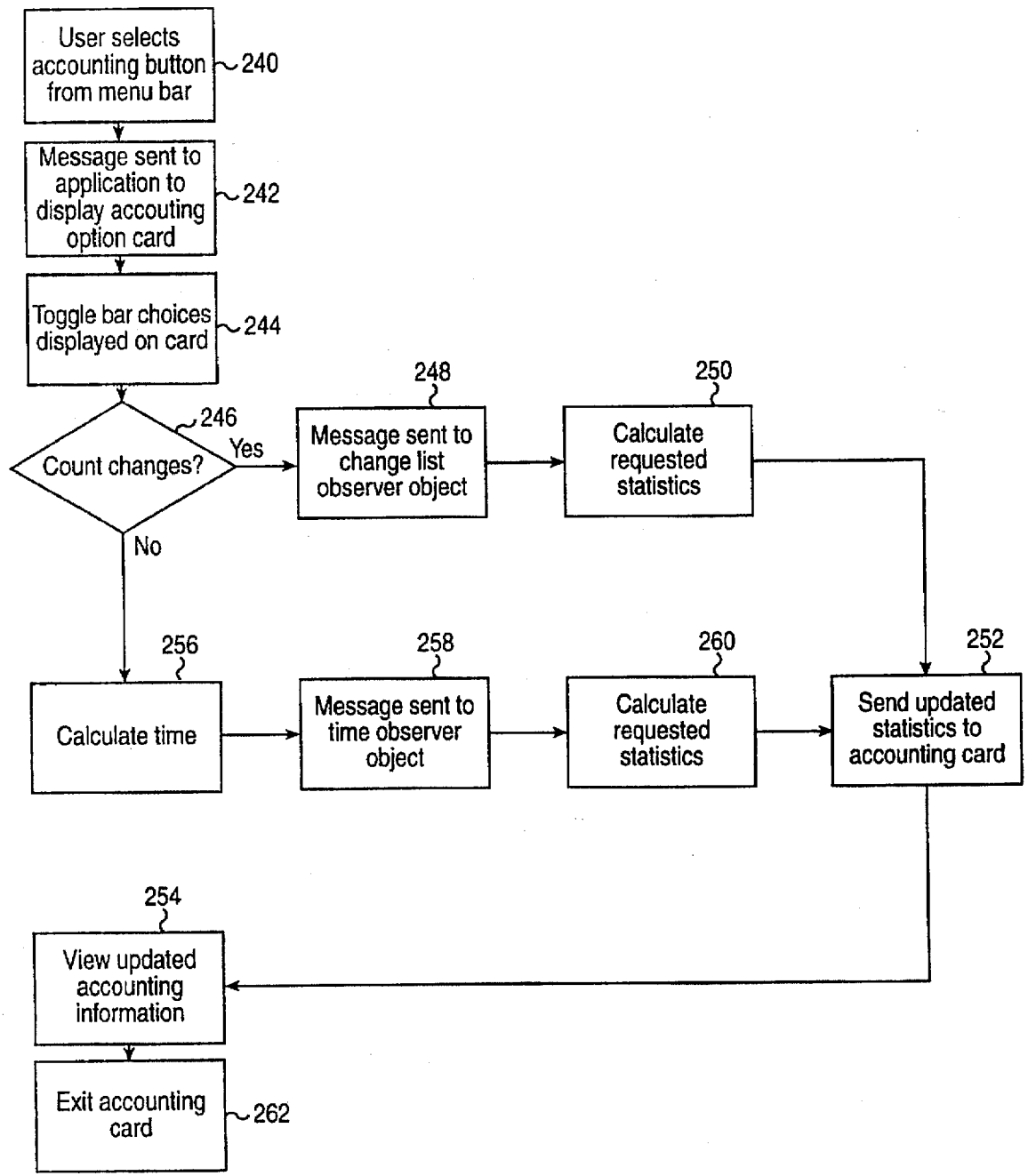
FIG. 17B shows a flow chart for indicating how the production editor verifies the time spent by the copy editor.

FIG. 17B shows a flow chart for indicating how the production editor verifies the time spent by the copy editor. Specifically, the user, in this case, the production editor, selects an accounting button from the menu bar on the screen in step 240, whereupon a message is sent in step 242 to display an accounting option card on the screen having a toggle bar which displays the different documents on the card. By toggling the toggle bar with the pen, in step 244, the accounting information for a particular document can be selected.

The computer then asks the production editor in step 246, whether he wants information such as the number of changes made and the number of times the job was opened. If yes, a message is sent in step 248 to change a list for the observer object, that is, to obtain a list of the changes for that document, and the requested statistics are calculated in step 250. For example, statistics such as the total number of changes made, the number of changes made per hour, and so on can be obtained. These statistics are used to update the accounting card or storage area for that document, in step 252, whereupon the updated accounting information can be viewed in step 254.

If the answer to step 246 is no, that is, the production editor does not want information regarding the changes, but instead, wants information regarding the time spent, the process moves to step 256, whereupon the time is calculated, taking into consideration gaps of five minutes in which no page was turned and no changes were made. A message is then sent in step 258 to the time observer object, whereupon the requested statistics are calculated in step 260. The process then continues to step 254, and the accounting card or program is ended in step 262.

Thus, the present invention electronically mimics a paper manuscript. Specifically, it maintains the good points of paper manuscript and electronic word processing, while eliminating their drawbacks. All editing is performed in the same manner as hard copy paper editing. Changes are made to the copy through the use of an electronic pen on a page relational manuscript. Copy editor uses pen 19 to insert text, delete text, flag author queries, add new paragraphs, make upper case, lower case, all capitalizations, initial capitalization, small capitalization, italic, bold, and the like. This allows for a hard copy laser printout with all the changes shown in "handwritten" form. The author can easily find and see all changes and comments from the copy editor and then respond to the changes on paper. There is no more confusion on heavily-edited manuscripts, due to the organization of the changes.

Further, all changes are converted automatically to typed characters, thereby eliminating re-keyboarding or interpretation problems. This allows fully-edited disks to be supplied for typesetting without re-keying the edits from the hard copy onto the electronic manuscript.

Still further, typesetting tags, such as chapter number, chapter title, one heads, extracts, and the like are inserted into the manuscript just as on paper. They automatically convert to recognizable codes ready for typesetting systems and final output. This interactive editing and coding of manuscripts from the beginning of the production cycle reduces turnaround time and significantly lowers typesetting costs.

Finally, the time management tools keep track of editing time, keystrokes, number of edit changes and the like.

Thus, copy editing apparatus 10 provides all of the advantages of conventional computer technology with the ease, comfort, and flexibility of traditional paper copy editing, reducing the time spent copy editing, re-proofing, and re-keyboarding, thereby saving money.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention as defined by the appended claims.

What is claimed is:

1. A pen-based computer copy editing apparatus comprising:

screen means for displaying original text thereon in a typewritten font;

pen means for writing on said screen means in an inkless manner by moving along said screen means; and central processing means for:
        identifying:
            handwriting,
            first gestures corresponding to insertions of text at a designated location in said original text in response to movement of said pen means along said screen means, and
            second gestures corresponding to deletions of text in said original text in response to movement of said pen means along said screen means, and
        controlling said screen means in response:
            substantially only to said handwriting and said first gestures to display the inserted text corresponding to said handwriting only in a predetermined, fixed handwritten font different from the typewritten font already displayed on the screen means, at said designated location in said original text, wherein the inserted text is discernable from text on the screen means in the typewritten font, and
            to said second gestures by said pen means to:

delete said second gestures which are displayed on said screen, display the original deleted text, and display a strike-out across the original deleted text for providing a visual difference of the original deleted text from remaining portions of the original text which are not deleted.

2. A pen-based computer copy editing apparatus comprising:

screen means for displaying original text thereon in a typewritten font;

pen means for writing on said screen means in an inkless manner by moving along said screen means;

central processing means for:

identifying handwriting and gestures by a person in response to movement of said pen means along said screen means, and controlling said screen means to mark said original text at a desired location so as to display an indication with respect to an author query in said original text at said desired location, said author query being an indication of an inquiry to be posed to an author, and controlling said screen means to display a writing pad by which a person can enter a question corresponding to said author query, and controlling said screen means to display said mark in said original text at said desired position even after a new operation has been started; and storage means for storing said entered question in correspondence with said author query and apart from said original text, for later display by an author.

3. A pen-based computer copy editing apparatus according to claim 2, wherein said central processing means creates a separate list of said author queries.

4. A pen-based computer copy editing apparatus comprising:

screen means for displaying original text thereon;

pen means for writing on said screen means in an inkless manner by moving along said screen means;

storage means for storing a document containing said text, and for storing a table containing a list of symbols to be replaced and a corresponding list of replacing symbols;

central processing means for:

examining each word of the document, automatically searching if there is a match for each word in said document with one said symbol found in said list of symbols to be replaced in a continuous, single search operation, and automatically and continuously replacing each said word in said document with a replacing word from said corresponding list, without any input by a user, each time that a match is found while leaving each replaced word in the document with a strike-out indication therethrough.

5. A pen-based computer copy editing apparatus comprising:

screen means for displaying original text thereon;

pen means for writing on said screen means in an inkless manner by moving along said screen means;

storage means for storing a document containing said text and having page breaks with a bottom page line delimiter for each page of the document;

central processing means for:

locking the page breaks of the document, maintaining the locking of the page breaks when adding text to any page of the document, extending the bottom page line delimiter when text is added to a particular page exceeding a maximum lower position of the bottom page line delimiter of the particular page so that the added text remains on said particular page.

6. A pen-based computer copy editing apparatus comprising:

means for displaying original text thereon comprised of characters, spaces, symbols and typesetting codes, said typesetting codes being abbreviated printing instructions for said text in a final form, said final form not being viewable on said means for displaying, such that the total number of pages of said original text that is displayed may be different from the total number of pages of the final form of said text that will be printed;

pen means for writing on said screen means in an inkless manner by moving along said screen means;

storage means for storing a document containing said text with said characters, spaces, symbols and typesetting codes therein;

central processing means for:

assigning a numerical value to each said character, space and symbol in accordance with the anticipated space said characters, spaces and symbols will occupy on a printed page, determined in accordance with said typesetting codes, and adding said numerical values to obtain a total numerical value for the document, which corresponds to the total number of printed pages that said document will occupy in said final form.

7. A pen-based computer copy editing apparatus comprising:

screen means for displaying original text thereon;

pen means for writing on said screen means in an inkless manner by moving along said screen means;

storage means for storing said text under a set file name;

central processing means for:

modifying said text in response to movement of said pen means along said screen means, and keeping track of at least one of:

the amount of time in which said original text stored in said storage means under said set file name is being modified, the number of changes made to said text stored in said storage means under said set file name, and the number of times a file corresponding to the original text and stored in said storage means under said set file name is opened.

8. A method for editing original text in a pen-based computer system, comprising the steps of:

displaying the original text on a screen;

writing on said screen with an inkless pen by moving said pen along said screen;

electronically identifying handwriting and first gestures corresponding to insertions of text at a designated location in said original text in response to movement of said pen along said screen;

electronically identifying second gestures corresponding to deletions of text in said original text in response to movement of said pen along said screen, and displaying the inserted text corresponding to said handwriting only in a predetermined, fixed handwritten font different from the typewritten font already displayed on the screen, at said designated location in said original text, in response substantially only to said handwriting and said first gestures in order to view said inserted text without reference to said original text deleting said second gestures which are displayed on said screen;

displaying the original deleted text; and displaying a strike-out across the original deleted text for providing a visual difference of the original deleted text from remaining portions of the original text which are not deleted.

9. A method according to claim 8, further including the step of deleting all stricken-out text, changing all handwritten fonts to typewritten fonts and changing all codes for typesetting, after final approval of the modified text.

10. A method for editing original text in a pen-based computer system, comprising the steps of:

displaying the original text on a screen;

writing on said screen with an inkless pen by moving said pen along said screen;

electronically identifying handwriting and gestures corresponding to insertions of text at a designated location in said original text in response to movement of said pen along said screen;

displaying the inserted text corresponding to said handwriting only in a predetermined, fixed handwritten font different from the typewritten font already displayed on the screen, at said designated location in said original text, in response substantially only to said handwriting and gestures in order to view said inserted text without reference to said original text;

assigning page breaks to said original text;

locking the page breaks of the document;

maintaining the locking of the page breaks when adding text to any page of the document; and extending the bottom page line delimiter when text is added to a particular page exceeding a maximum lower position of the bottom page line delimiter of the particular page so that the added text remains on said particular page.

11. A method for editing original text in a pen-based computer system, comprising the steps of:

displaying the original text on a screen;

writing on said screen with an inkless pen by moving said pen along said screen;

electronically identifying handwriting and gestures corresponding to insertions of text at a designated location in said original text in response to movement of said pen along said screen;

displaying the inserted text corresponding to said handwriting only in a predetermined, fixed handwritten font different from the typewritten font already displayed on the screen, at said designated location in said original text, in response substantially only to said handwriting and gestures in order to view said inserted text without reference to said original text;

storing said text under a set file name in storage means; and keeping track of the amount of time in which said original text stored in said storage means under said set file name is being modified.

12. A method according to claim 11, further including the step of automatically and electronically keeping track of the number of modifications made in said original text under said set file name, the number of times a file corresponding to said original text is opened under said set file name, and the number of words in the modified original text under said set file name.

13. A method for editing original text in a pen-based computer system, comprising the steps of:

displaying the original text on a screen;

writing on said screen with an inkless pen by moving said pen along said screen;

electronically identifying handwriting and gestures corresponding to insertions of text at a designated location in said original text in response to movement of said pen along said screen;

displaying the inserted text corresponding to said handwriting only in a predetermined, fixed handwritten font different from the typewritten font already displayed on the screen, at said designated location in said original text, in response substantially only to said handwriting and gestures in order to view said inserted text without reference to said original text;

marking said original text at a desired location so as to display an indication on said screen with respect to an author query in said original text at said desired location, said author query being an indication of an inquiry to be posed to an author, displaying a writing pad on said screen by which a person can enter a question corresponding to said author query;

controlling said screen means to display said mark in said original text at said desired position even after a new operation has been started; and storing said entered question in storage means in correspondence with said author query and apart from said original text, for later display by an author.

14. A method according to claim 13, further including the step of creating a separate list of said author queries.

* * * * *